(12) United States Patent
Otto et al.

(10) Patent No.: US 8,600,924 B2
(45) Date of Patent: *Dec. 3, 2013

(54) METHOD AND SYSTEM TO MANAGE MULTIPLE PARTY REWARDS USING A SINGLE ACCOUNT AND ARTIFICIAL INTELLIGENCE

(75) Inventors: Jonathan Otto, Palm Beach, FL (US); Andrew Van Luchene, Santa Fe, NM (US); Raymond J Mueller, Palm Beach Gardens, FL (US); Michael R Mueller, legal representative, Oakland, CA (US)

(73) Assignee: RetailDNA, LLC, Garden City Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,307

(22) Filed: Dec. 9, 2011
(Under 37 CFR 1.47)

(65) Prior Publication Data

US 2012/0323661 A1 Dec. 20, 2012

Related U.S. Application Data

(63) Continuation-in-part of application No. 13/276,077, filed on Oct. 18, 2011, now Pat. No. 8,306,937, which is a continuation of application No. 12/322,094, filed on Jan. 29, 2009, now Pat. No. 8,041,667, which is a continuation-in-part of application No. 12/151,043, filed on May 2, 2008, now abandoned, which is a continuation-in-part of application No. 11/983,679, filed on Nov. 9, 2007, now abandoned, which is a continuation-in-part of application No. 09/993,228, filed on Nov. 14, 2001, now abandoned, application No. 13/316,307, which is a continuation-in-part of application No. 12/151,038, filed on May 2, 2008, now abandoned, which is a continuation-in-part of application No. 11/983,679, filed on Nov. 9, 2007, now abandoned, which is a continuation-in-part of application No. 09/993,228, filed on Nov. 14, 2001, now abandoned.

(51) Int. Cl.
*G06F 17/00* (2006.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| | | |
|---|---|---|
| 5,353,219 A | 10/1994 | Mueller et al. |
| 5,794,207 A | 8/1998 | Walker et al. |

(Continued)

OTHER PUBLICATIONS

U.S. Appl. No. 08/943,483, filed Oct. 3, 1997, by Walker et al., abandoned, 50 pages.

(Continued)

*Primary Examiner* — Michael B Holmes
(74) *Attorney, Agent, or Firm* — Michael D. Downs; Fincham Downs, LLC

(57) ABSTRACT

Systems and methods for storing a transaction history with respect to a business entity, and an incentive regarding a business entity, previously offered to an account. A desired transaction involving a holder of the account and the business entity may be generated based on the transaction history and a metric. An incentive may be generated based on an artificial intelligence program (AIP), the transaction history, and the metric. The desired transaction and the incentive may be transmitted for presentation to a holder of the account.

20 Claims, 7 Drawing Sheets

(56) References Cited

U.S. PATENT DOCUMENTS

| | | | |
|---|---|---|---|
| 6,026,375 | A | 2/2000 | Hall et al. |
| 6,052,667 | A | 4/2000 | Walker et al. |
| 6,055,513 | A | 4/2000 | Katz et al. |
| 6,085,169 | A | 7/2000 | Walker et al. |
| 6,119,100 | A | 9/2000 | Walker et al. |
| 6,223,163 | B1 | 4/2001 | Van Luchene |
| 6,230,150 | B1 | 5/2001 | Walker et al. |
| 6,267,670 | B1 | 7/2001 | Walker et al. |
| 6,298,329 | B1 | 10/2001 | Walker et al. |
| 6,298,331 | B1 | 10/2001 | Walker et al. |
| 6,452,498 | B2 | 9/2002 | Stewart |
| 6,507,279 | B2 | 1/2003 | Loof |
| 6,553,346 | B1 | 4/2003 | Walker et al. |
| 6,567,787 | B1 | 5/2003 | Walker et al. |
| 6,598,024 | B1 | 7/2003 | Walker et al. |
| 6,646,659 | B1 | 11/2003 | Brown et al. |
| 6,920,319 | B2 | 7/2005 | Knutsson et al. |
| 6,920,431 | B2 | 7/2005 | Showghi et al. |
| 6,996,460 | B1 | 2/2006 | Krahnstoever et al. |
| 7,028,894 | B2 | 4/2006 | Turner et al. |
| 7,072,850 | B1 | 7/2006 | Van Luchene |
| 7,248,855 | B2 | 7/2007 | Joyce et al. |
| 7,272,569 | B1 | 9/2007 | Walker et al. |
| 7,318,041 | B2 | 1/2008 | Walker et al. |
| 7,437,344 | B2 | 10/2008 | Peyrelevade |
| 7,542,919 | B1 | 6/2009 | Mueller et al. |
| 7,677,974 | B2 | 3/2010 | Van Luchene |
| 7,689,508 | B2 | 3/2010 | Davis et al. |
| 7,739,140 | B2 | 6/2010 | Vinson et al. |
| 7,769,623 | B2 | 8/2010 | Mittal et al. |
| 7,770,184 | B2 | 8/2010 | Miller et al. |
| 7,806,758 | B2 | 10/2010 | Van Luchene |
| 7,877,611 | B2 | 1/2011 | Camacho et al. |
| 7,922,581 | B2 | 4/2011 | Potts |
| 8,041,667 | B2 * | 10/2011 | Otto et al. ............ 706/47 |
| 8,103,520 | B2 * | 1/2012 | Mueller et al. .......... 705/1.1 |
| 8,224,760 | B2 * | 7/2012 | Otto et al. ............ 706/45 |
| 8,306,937 | B2 * | 11/2012 | Otto et al. ............ 706/47 |
| 2003/0018531 | A1 | 1/2003 | Mahaffy et al. |
| 2003/0083936 | A1 | 5/2003 | Mueller et al. |
| 2004/0002900 | A1 | 1/2004 | Cohen et al. |
| 2004/0104930 | A1 | 6/2004 | Stoler |
| 2004/0230440 | A1 | 11/2004 | Malhotra |
| 2004/0230496 | A1 | 11/2004 | Neuman et al. |
| 2005/0055236 | A1 | 3/2005 | Bondy et al. |
| 2005/0194433 | A1 | 9/2005 | Zimmerman |
| 2005/0203771 | A1 | 9/2005 | Achan |
| 2006/0033625 | A1 | 2/2006 | Johnson et al. |
| 2006/0052888 | A1 | 3/2006 | Bayoumi et al. |
| 2006/0059032 | A1 | 3/2006 | Wong et al. |
| 2008/0208787 | A1 | 8/2008 | Van Luchene |
| 2008/0306790 | A1 | 12/2008 | Otto et al. |
| 2008/0313052 | A1 | 12/2008 | Otto et al. |
| 2008/0313122 | A1 | 12/2008 | Otto et al. |
| 2009/0024481 | A1 | 1/2009 | Otto et al. |
| 2009/0030797 | A1 | 1/2009 | Otto et al. |
| 2009/0030798 | A1 | 1/2009 | Otto et al. |
| 2009/0125380 | A1 | 5/2009 | Otto et al. |
| 2009/0125394 | A1 | 5/2009 | Otto et al. |
| 2009/0125396 | A1 | 5/2009 | Otto et al. |
| 2009/0132344 | A1 | 5/2009 | Otto et al. |
| 2009/0182630 | A1 | 7/2009 | Otto et al. |
| 2009/0182677 | A1 | 7/2009 | Otto et al. |

OTHER PUBLICATIONS

U.S. Appl. No. 09/045,347, filed Mar. 20, 1998, by Alderucci et al., abandoned, 29 pages.
U.S. Appl. No. 09/083,689, filed May 21, 1998, by Van Luchene, abandoned, 50 pages.
U.S. Appl. No. 09/098,240, filed Jun. 16, 1998, by Walker et al., abandoned, 50 pages.
U.S. Appl. No. 09/282,747, filed Mar. 31, 1999, by Walker et al., abandoned, 89 pages.
U.S. Appl. No. 09/538,751, filed Mar. 30, 2000, by Walker et al., abandoned, 82 pages.
U.S. Appl. No. 60/239,610, filed Oct. 11, 2000, by Mueller et al., expired, 99 pages.
Notice of Allowability mailed Jun. 20, 2011, in U.S. Appl. No. 12/322,094, 11 pages.
Office Action mailed Sep. 20, 2010, in U.S. Appl. No. 12/151,038, 9 pages.
Office Action mailed Jun. 9, 2011, in U.S. Appl. No. 12/151,038, 10 pages.

* cited by examiner

METHOD AND SYSTEM TO MANAGE MULTIPLE PARTY REWARDS USING A SINGLE ACCOUNT AND ARTIFICIAL INTELLIGENCE

CROSS-REFERENCE TO RELATED APPLICATIONS

The present application is a continuation-in-part application of U.S. patent application Ser. No. 13/276,077, filed Oct. 18, 2011, now U.S. Pat. No. 8,306,937 and entitled "Method and System to Manage Multiple Party Rewards Using a Single Account and Artificial Intelligence,"
  which is a continuation application of U.S. patent application Ser. No. 12/322,094, filed Jan. 29, 2009, issued as U.S. Pat. No. 8,041,667, and entitled "Method and System to Manage Multiple Party Rewards Using a Single Account and Artificial Intelligence,"
  which is a continuation-in-part patent application of U.S. patent application Ser. No. 12/151,043, filed May 2, 2008, now abandoned and entitled "Method and System for Centralized Generation of a Business Executable Using Genetic Algorithms and Rules Distributed Among Multiple Hardware Devices,"
  which is a continuation-in-part of U.S. patent application Ser. No. 11/983,679, filed Nov. 9, 2007, now abandoned and entitled "Method and System for Generating, Selecting, and Running Executables in a Business System Utilizing a Combination of User Defined Rules and Artificial Intelligence,"
  which is a continuation-in-part patent application of U.S. patent application Ser. No. 09/993,228, filed Nov. 14, 2001, now abandoned and entitled "Method and Apparatus for Dynamic Rule and/or Offer Generation,"
  which applications are incorporated by reference in the present application.

The present application also is a continuation-in-part application of U.S. patent application Ser. No. 12/151,038, filed May 2, 2008, now abandoned and entitled "Method and Apparatus for Generating and Transmitting an Order Initiation Offer to a Wireless Communications Device,"
  which is a continuation-in-part of U.S. patent application Ser. No. 11/983,679, filed Nov. 9, 2007, now abandoned and entitled "Method and System for Generating, Selecting, and Running Executables in a Business System Utilizing a Combination of User Defined Rules and Artificial Intelligence,"
  which is a continuation-in-part patent application of U.S. patent application Ser. No. 09/993,228, filed Nov. 14, 2001, now abandoned and entitled "Method and Apparatus for Dynamic Rule and/or Offer Generation,"
  which applications are incorporated by reference in the present application.

This application is related to: U.S. patent application Ser. No. 09/052,093 entitled "Vending Machine Evaluation Network" and filed Mar. 31, 1998; U.S. patent application Ser. No. 09/083,483 entitled "Method and Apparatus for Selling an Aging Food Product" and filed May 22, 1998; U.S. patent application Ser. No. 09/282,747 entitled "Method and Apparatus for Providing Cross-Benefits Based on a Customer Activity" and filed Mar. 31, 1999; U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers," filed on Sep. 4, 1996 and issued as U.S. Pat. No. 5,794,207 on Aug. 11, 1998; U.S. patent application Ser. No. 08/920,116 entitled "Method and System for Processing Supplementary Product Sales at a Point-Of-Sale Terminal" and filed Aug. 26, 1997, which is a continuation-in-part of U.S. patent application Ser. No. 08/822,709 entitled "System and Method for Performing Lottery Ticket Transactions Utilizing Point-Of-Sale Terminals" and filed Mar. 21, 1997; U.S. patent application Ser. No. 09/135,179 entitled "Method and Apparatus for Determining Whether a Verbal Message Was Spoken During a Transaction at a Point-Of-Sale Terminal" and filed Aug. 17, 1998; U.S. patent application Ser. No. 09/538,751 entitled "Dynamic Propagation of Promotional Information in a Network of Point-of-Sale Terminals" and filed Mar. 30, 2000; U.S. patent application Ser. No. 09/442,754 entitled "Method and System for Processing Supplementary Product Sales at a Point-of-Sale Terminal" and filed Nov. 12, 1999; U.S. patent application Ser. No. 09/045,386 entitled "Method and Apparatus For Controlling the Performance of a Supplementary Process at a Point-of-Sale Terminal" and filed Mar. 20, 1998; U.S. patent application Ser. No. 09/045,347 entitled "Method and Apparatus for Providing a Supplementary Product Sale at a Point-of-Sale Terminal" and filed Mar. 20, 1998; U.S. patent application Ser. No. 09/083,689 entitled "Method and System for Selling Supplementary Products at a Point-of Sale and filed May 21, 1998; U.S. patent application Ser. No. 09/045,518 entitled "Method and Apparatus for Processing a Supplementary Product Sale at a Point-of-Sale Terminal" and filed Mar. 20, 1998; U.S. patent application Ser. No. 09/076,409 entitled "Method and Apparatus for Generating a Coupon" and filed May 12, 1998; U.S. patent application Ser. No. 09/045,084 entitled "Method and Apparatus for Controlling Offers that are Provided at a Point-of-Sale Terminal" and filed Mar. 20, 1998; U.S. patent application Ser. No. 09/098,240 entitled "System and Method for Applying and Tracking a Conditional Value Coupon for a Retail Establishment" and filed Jun. 16, 1998; U.S. patent application Ser. No. 09/157,837 entitled "Method and Apparatus for Selling an Aging Food Product as a Substitute for an Ordered Product" and filed Sep. 21, 1998, which is a continuation of U.S. patent application Ser. No. 09/083,483 entitled "Method and Apparatus for Selling an Aging Food Product" and filed May 22, 1998; U.S. patent application Ser. No. 09/603,677 entitled "Method and Apparatus for selecting a Supplemental Product to offer for Sale During a Transaction" and filed Jun. 26, 2000; U.S. Pat. No. 6,119,100 entitled "Method and Apparatus for Managing the Sale of Aging Products and filed Oct. 6, 1997 and U.S. Provisional Patent Application No. 60/239,610 entitled "Methods and Apparatus for Performing Upsells" and filed Oct. 11, 2000.

By "related to" we mean that the present application and the applications noted above are in the same general technological area and have a common inventor or assignee. However, "related to" does not necessarily mean that the present application and any or all of the applications noted above are patentably indistinct, or that the filing date for the present application is within two months of any of the respective filing dates for the applications noted above.

FIELD OF THE INVENTION

The disclosure relates generally, in accordance with some embodiments, to a method and system for managing rewards for a multi-tiered account and, more particularly, to a method and system for providing such management using artificial intelligence. The disclosure relates generally, in accordance with some embodiments, to a method and system for the generation and transmission of targeted initiation offers to an identified WCD or end user using one or both of at least one rule or an artificial intelligence program.

BACKGROUND OF THE INVENTION

The management of rewards for an account is known, for example, as disclosed in U.S. Published Patent Applications 2002/0087410 (Walker et al.), incorporated by reference herein. Unfortunately, such programs are not self-learning.

Thus, there is a long-felt need to provide a system and a method to manage rewards for a multi-tiered account that is dynamic and can be readily adapted to meet various and variable requirements.

SUMMARY OF THE INVENTION

In one embodiment, a system is provided for managing an account having at least one sub-account, including: a memory unit, for at least one specially programmed general-purpose computer, for storing a transaction history for the account with respect to a business entity, an incentive regarding the business entity previously offered to the account, and an artificial intelligence program (AIP), wherein the transaction history includes at least one transaction involving the business entity and the main account or the business entity and the at least one sub-account; a processor for the at least one specially programmed general-purpose computer for: comparing the transaction history with a metric; generating, using the comparison of the transaction history with the metric, a desired transaction involving the account and the business entity; and modifying the incentive using the AIP and the comparison of the transaction history with the metric, wherein rewarding of the modified incentive is conditional upon execution of the desired transaction; and an interface element, for the at least one specially programmed general-purpose computer, for transmitting the desired transaction and the modified incentive for presentation to a holder of the account.

In one embodiment, the processor is for determining the metric using the AIP and the memory element is for storing the metric. In another embodiment, the memory element is for storing data regarding the account, the data different than the transaction history and the processor is for: generating, using the data and the AIP, the metric; comparing the transaction history with the metric using the data; generating the desired transaction using the data; modifying the incentive using the data; or transmitting the desired transaction and the modified incentive using the data. In a further embodiment, comparing the transaction history with the metric includes using the AIP. In yet another embodiment, the processor is for generating the incentive using the AIP.

In one embodiment, the interface element is for receiving data regarding a transaction, between the business entity and the account, transacted following transmission of the desired transaction and the modified incentive and the processor is for comparing the data with respect to the desired transaction. For compliance of the transaction with the desired transaction, the processor is for authorizing reward of the modified incentive. For non-compliance of the transaction with the desired transaction, the processor is for further modifying, using the AIP, the modified incentive according to the comparison of the transaction and the desired transaction.

In one embodiment, the processor is for generating, using the AIP, at least one rule, the memory element is for storing the at least one rule, and the processor is for generating the desired transaction using the at least one rule or modifying the incentive using the at least one rule. In another embodiment, the memory element is for storing at least one rule, the processor is for modifying, using the AIP, the at least one rule according to the comparison of the transaction history with the metric, and the processor is for generating the desired transaction using the at least one modified rule or modifying the incentive using the at least one modified rule.

In one embodiment, the processor is for generating, using the transaction history and the AIP, a conversion metric, the interface element is for receiving a request to transfer a reward within the account, and the processor is for modifying the reward using the conversion metric and transferring the modified reward within the account. In another embodiment, the interface element is for receiving at least one rule from a wireless communications device (WCD) or from a general-purpose computer associated with the business entity or another business entity, the memory element is for storing the at least one rule, and the processor is for: comparing the transaction history with the metric using the at least one rule; modifying the incentive using the at least one rule; generating the desired transaction using the at least one rule; or transmitting the desired transaction and the modified incentive using the at least one rule.

In one embodiment, the processor is for transmitting the desired transaction and the modified incentive to a WCD with a memory element and a processor, and the memory element for the WCD is for storing the at least one rule, and the processor for the WCD is for executing the desired transaction or the modified incentive according to the at least one rule.

In one embodiment, a system is provided for managing an account having at least one sub-account, including: a memory unit, for at least one specially programmed general-purpose computer, for storing a transaction history for the account with respect to a business entity and an artificial intelligence program (AIP), the transaction history including at least one transaction involving the business entity and the main account or the business entity and the at least one sub-account; a processor for the at least one specially programmed general-purpose computer for: comparing the transaction history with a metric; generating, using the AIP and the comparison of the transaction history with the metric, a desired transaction involving the account and the business entity; and generating, using the AIP and the comparison of the transaction history with the metric, an incentive, rewarding of the incentive conditional upon execution of the desired transaction; and an interface element, for the at least one specially programmed general-purpose computer, for transmitting the desired transaction and the incentive for presentation to a holder of the account.

Some embodiments comprise a method for managing an account having at least one sub-account.

In one embodiment, a system is provided for generating and transmitting an order initiation offer to a wireless communications device (WCD), including: an identification element, in a processor of at least one specially programmed general-purpose computer, arranged to identify, using an interface element in the general-purpose computer, a WCD; an eligibility element, in the processor, arranged to determine if the WCD is eligible to receive an order initiation offer; an executable element, in the processor, arrange to generate, using at least one of a first set of rules and a first artificial intelligence program, at least one executable, the first set of rules and the first artificial intelligence program stored in a memory unit for the at least one general-purpose computer; an offer element, in the processor, arranged to generate, for an eligible WCD and using the at least one executable, an appropriate order initiation offer; and a transmission element, in the processor, arranged to transmit, using the interface element, the appropriate order initiation offer to a wireless communications network for transmission to the WCD.

In one embodiment, the system includes a location element, in the processor arranged to determine, using the interface element, a location for the WCD. The eligibility element is arranged to determine eligibility in response to the location, the executable element is arranged to generate the at least one executable responsive to the location, or the offer element is arranged to generate an appropriate order initiation offer responsive to the location.

In one embodiment, the system includes a transaction element arranged to access a transaction history, stored in the memory unit, for an end user associated with the WCD. The eligibility element is arranged to determine eligibility in response to the history, the executable element is arranged to generate the at least one executable responsive to the history, or the offer element is arranged to generate an appropriate order initiation offer responsive to the history.

In one embodiment, the system includes a volume element, in the processor, arranged to determine a transaction volume for at least one retail location. The eligibility element is arranged to determine eligibility in response to the volume, the executable element is arranged to generate the at least one executable responsive to the volume, or the offer element is arranged to generate an appropriate order initiation offer responsive to the volume.

In one embodiment, the system includes an order element, in the processor, arranged to determine whether an order has been placed previously using the WCD. The eligibility element is arranged to determine eligibility in response to whether an order has been placed previously using the WCD, the executable element is arranged to generate the at least one executable responsive to whether an order has been placed previously using the WCD, or the offer element is arranged to generate an appropriate order initiation offer responsive to whether an order has been placed previously using the WCD.

In one embodiment, the order element is arranged to determine whether an order has been placed previously using the WCD during a specified time of day or a specified day of the week. The eligibility element is arranged to determine eligibility in response to whether an order has been placed previously using the WCD during a specified time of day or a specified day of the week, the executable element is arranged to generate the at least one executable responsive to whether an order has been placed previously using the WCD during a specified time of day or a specified day of the week, or the offer element is arranged to generate an appropriate order initiation offer responsive to whether an order has been placed previously using the WCD during a specified time of day or a specified day of the week. In a sixth embodiment, the eligibility element is arranged to generate, using at least one of a second set of rules and a second artificial intelligence program, at least one second executable, the second set of rules and the second artificial intelligence program stored in the memory unit and the eligibility element is arranged to determine if the WCD is eligible to receive an order initiation using the at least one second executable.

In one embodiment, the eligibility element is arranged to determine if an end user associated with the WCD is eligible for the order initiation offer. In an eighth embodiment, the eligibility element is arranged to determine eligibility in response to a time of day, the executable element is arranged to generate the at least one executable responsive to the time of day, or the offer element is arranged to generate an appropriate order initiation offer responsive to the time of day. In a ninth embodiment, the eligibility element is arranged to determine eligibility in response to a day of the week, the executable element is arranged to generate the at least one executable responsive to the day of the week, or the offer element is arranged to generate an appropriate order initiation offer responsive to the day of the week.

In one embodiment, the system includes a receiving element, in the processor, arranged to receive, using the interface element, a transmission from the WCD via the communication network and the identification element is arranged to identify the WCD in response to the transmission. In an eleventh embodiment the system includes an inventory element, in the processor, arranged to obtain inventory information. The eligibility element is arranged to determine eligibility in response to inventory information, the executable element is arranged to generate the at least one executable responsive to inventory information, or the offer element is arranged to generate an appropriate order initiation offer responsive to inventory information.

In one embodiment, the offer element is arranged to determine a redemption rate for the appropriate order initiation offer, the executable element is arranged to generate, using the redemption rate, and at least one of a second set of rules and a second artificial intelligence program stored in the memory unit, at least one second executable, the offer element is arranged to generate, using the at least one second executable, a second appropriate order initiation offer, and the transmission element is arranged to transmit the second appropriate order initiation offer to the wireless communications network for transmission to the WCD. In a thirteenth embodiment, the offer element is arranged to modify, using the redemption rate, the at least one of a first set of rules and a first artificial intelligence program to create the at least one of a second set of rules and a second artificial intelligence program.

Some embodiments comprise a method for generating and transmitting an order initiation offer to a wireless communications device (WCD).

It is a general object, in accordance with some embodiments of the present invention, to provide a system and a method to generate and transmit targeted initiation offers to an identified WCD or end user using one or both of a set of rules and an artificial intelligence program.

It is a general object, in accordance with some embodiments of the present invention, to provide a system and a method to manage rewards for a multi-tiered account that is dynamic and can be readily adapted to meet various and variable requirements.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of various embodiments of the present invention will now be more fully described in the following detailed description of the invention taken with the accompanying drawing Figures, in which.

DETAILED DESCRIPTION

At the outset, it should be appreciated that like drawing numbers on different drawing views identify identical, or functionally similar, structural elements of the invention. While various embodiments of the present invention are described with respect to what is presently considered to be the preferred aspects, it is to be understood that any particular embodiments as claimed are not limited to the disclosed aspects.

Furthermore, it is understood that the various embodiments of the invention are not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein shall include the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that the use of "or" in the present application is with respect to a "non-exclusive" arrangement, unless stated otherwise. For example, when saying that "item x is A or B," it is understood that this can mean one of the following: 1) item x is only one or the other of A and B; and 2) item x is both A and B. Alternately stated, the word "or" is not used to define an "exclusive or" arrangement. For example, an "exclusive or" arrangement for the statement "item x is A or B" would require that x can be only one of A and B.

Figure 1:
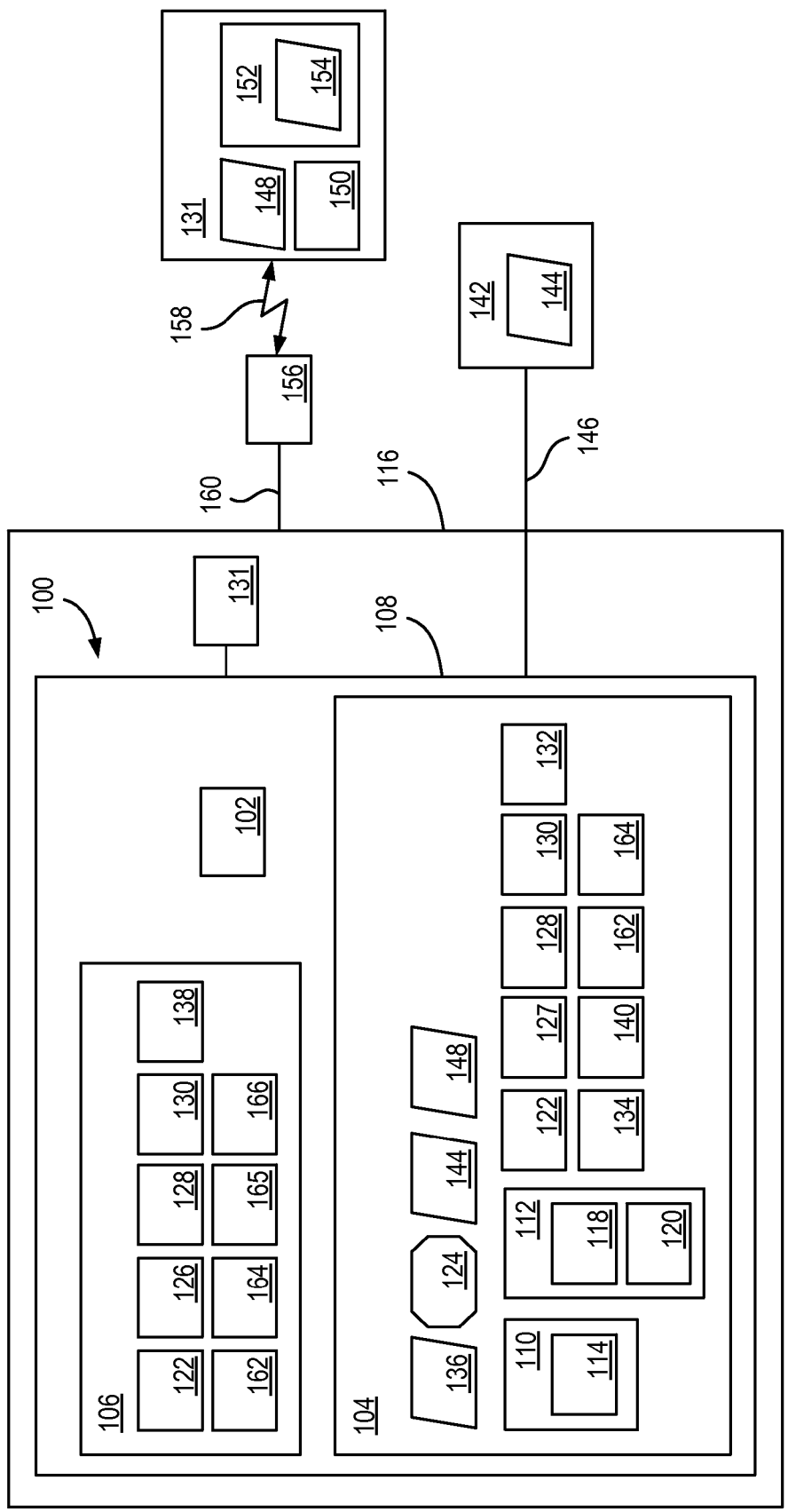
FIG. 1 is a schematic block diagram of a present invention system for managing an account having at least one sub-account.

FIG. 1 is a schematic block diagram of present invention system 100 for managing an account having at least one sub-account. The system includes interface element 102, memory element 104, and processor 106 for at least one specially programmed general-purpose computer 108. The memory element stores transaction history 110 for account 112. The transaction history includes at least one transaction 114 involving a business entity, for example, the business entity associated with location 116 and account 112. Any transaction involving a customer and a business entity is included in the spirit and scope of the claimed invention. Account 112 includes main, or master, account 118 and at least one sub-account 120. Thus, account 112 includes one or more sub-accounts. Account 112 is not limited to a particular number of sub-accounts. Transaction 114 can include any combination of the main account and one or more sub-accounts from sub-accounts 120. For example, the transaction can include the main account and a sub-account from sub-accounts 120, or can include only sub-accounts from sub-accounts 120. The memory element also stores incentive 122, previously offered to the account by the business entity, and artificial intelligence program (AIP) 124. In one embodiment, the processor updates the transaction history with transaction 114.

In one embodiment, the processor is for generating comparison 126 by comparing the transaction history with metric 127 and generating, using the comparison, desired transaction 128 involving the account and the business entity. Metric 127 can be any metric known in the art and the metric can be part of any classification system known in the art. In another embodiment, the processor generates modified incentive 130 by modifying incentive 122 using the AIP and the comparison. In a further embodiment, the desired transaction and the modified incentive are stored in the memory element. The eventual rewarding of the modified incentive is conditional upon execution of the desired transaction as described infra. In one embodiment, the processor transmits, via the interface element, desired transaction 128 and modified incentive 130 for presentation to a holder (not shown) of the account. Incentive 130 can be any incentive known in the art, for example, including, but not limited to a discount on an item or service or a free item or service. Hereinafter, the term "incentive" if not further delineated refers to incentive 122 or modified incentive 130.

In one embodiment, desired transaction 128 and modified incentive 130 are transmitted for presentation on any point of sale (POS) station known in the art, for example, POS station 131 in location 116. In another embodiment, the offer is transmitted for presentation on any device, remote from a location associated with the first business entity, such as location 116, known in the art, for example, a remote kiosk (not shown) or a wireless communications device (WCD), for example, WCD 131. WCD 131 can be any WCD known in the art. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to interaction of the WCD and system 100.

By interface element, we mean any combination of hardware, firmware, or software in a computer used to enable communication or data transfer between the computer and a device, system, or network external to the computer. The interface element can connect with the device, system, or network external to the computer using any means known in the art, including, but not limited to a hardwire connection, an optical connection, an Internet connection, or a radio frequency connection. Processor 106 and interface element 102 can be any processor or interface element, respectively, or combination thereof, known in the art.

Computer 108 can be any computer or plurality of computers known in the art. In one embodiment, the computer is located in a retail location with which system 100 is associated, for example, location 116. In another embodiment (not shown), all or parts of the computer are remote from retail locations with which system 100 is associated. In a further embodiment, computer 108 is associated with a plurality of retail locations with which system 100 is associated. Thus, the computer provides the functionality described for more than one retail location.

In another embodiment, the processor determines metric 127 using the AIP and the memory element stores the metric. In another embodiment, the processor compares the transaction history with the metric using the AIP. In a further embodiment, the processor generates the incentive using the AIP. That is, the processor generates the incentive modified in the processor operation described supra.

In one embodiment, the memory element stores data 132 regarding the account. Data 132 includes information other than the information shown in history 110, for example, information regarding one or more holders of the main or sub-accounts in account 112. The processor performs one or more of the following operations using the data: generating, using the AIP, the metric; comparing the transaction history with the metric; generating the desired transaction (in addition to using the AIP); modifying the incentive; or transmitting the respective data, for example, the format or content of the display of the desired transaction or incentive is configured according to information in data 132.

In one embodiment, the interface element receives data 134 regarding a transaction between the business entity and the account transacted following transmission of the respective data, and the processor compares data 134 with respect to the desired transaction. For example, if the desired transaction was a transaction including the main account and two sub-accounts, the processor determines if the transaction described by data 134 included the main account and two sub-accounts. For compliance of the transaction with the desired transaction, the processor authorizes reward of the modified incentive. The modified incentive can be rewarded using any means known in the art. The award can be provided by the business entity with which the account is transacting or by another entity, for example, a business entity contracted by the business entity to handle provision of rewards. For non-compliance of the transaction with the desired transaction, in one embodiment, the processor uses the AIP to further modify the modified incentive according to the comparison of the transaction and the desired transaction. For example, the processor and the AIP determine how to make the incentive more attractive to holders of the account such that the holders are motivated to perform the desired transaction.

In one embodiment, the memory element stores at least one rule 136. In general, rule 136 can be used in place of or in conjunction with the AIP in any or all of the operations described infra and supra regarding the AIP. For example, the processor uses the rule in one or more of the following operations: to generate or modify the desired transaction, the incentive, or the metric, to compare the transaction history with the metric, or to transmit the desired transaction or incentive. In another embodiment, the processor generates or modifies rule 136 using the AIP. In a further embodiment, the rule is modified using the AIP according to the comparison of the transaction history with the metric. Thus, the system is self-learning with respect to the rule and the rule can be automatically modified according to feed-back or changes in a metric or other benchmark. It should be understood that a modified rule 136 can be used for any or all of the operations described supra or infra for rule 136. Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007 is applicable to the operation of the AIP and rule 136.

In one embodiment, the processor generates conversion metric 138, using the AIP and the transaction history or data 134. The conversion metric is used for modifying rewards transferred between the main account and the sub-accounts or among the sub-accounts. Upon receipt by the interface element of a request to transfer a reward, for example, reward 140, within the account, the processor modifies the reward using the conversion metric and transfers the modified reward within the account. For example, according to compliance of a sub-account with respect to a specified metric, there may be a bonus, no modification, or a penalty applied to rewards transferred to or from the sub-account.

In one embodiment, computer 142, separate from computer 108, transmits modifying rule 144 to computer 108. Computer 142 can be in location 116 (not shown) or can be in a different location. Computer 142 can be associated with a business entity associated with location 116 or can be associated with a different business entity. Connection 146 between computers 108 and 142 can be any type known in the art. In another embodiment (not shown), multiple computers 142 are included and respective computers among the multiple computers can be associated with the same or different business entities. Computer 108 stores modifying rule 142 in memory 104.

In one embodiment, rule 142 is used with or in place of rule 136, or is used in conjunction with the AIP. For example, the processor can perform one or more of the following operations using rule 142: generate or modify the desired transaction, the incentive, or the metric, compare the transaction history with the metric, or transmit the desired transaction or incentive. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 142.

In one embodiment, computer 108 receives at least one modifying rule 148 from a WCD associated with the customer, for example, WCD 131, and stores the rule in memory 104. In one embodiment, rule 148 is used with or in place of rule 136, or is used in conjunction with the AIP. For example, the processor can perform one or more of the following operations using rule 148: generate or modify the desired transaction, the incentive, or the metric, compare the transaction history with the metric, or transmit the desired transaction or incentive. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 148.

In one embodiment, a WCD, for example, WCD 131, with a processor and a memory element, for example, processor 150 and memory 152, is usable to receive the desired transaction and the incentive. The memory element for the WCD stores at least one rule, for example, rule 154 and the processor for the WCD executes the desired transaction or the incentive according to the rule, for example, rule 154. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to the operations described regarding WCD 131, processor 150, rule 154, and presentation of the desired transaction or the incentive.

In one embodiment, a WCD usable with system 100, for example, WCD 131, is owned by, leased by, or otherwise already in possession of an end user when system 100 interfaces with the WCD. In the description that follows, it is assumed that the WCD is owned by, leased by, or otherwise already in possession of the end user when system 100 interfaces with the WCD. In general, the WCD communicates with a network, for example, network 156, via radio-frequency connection 158. Network 156 can be any network known in the art. In one embodiment, the network is located outside of the retail location, for example, the network is a commercial cellular telephone network. In one embodiment (not shown), the network is located in a retail location, for example, the network is a local network, such as a Bluetooth network. The interface element can connect with network 156 using any means known in the art, including, but not limited to a hardwire connection, an optical connection, an Internet connection, or a radio frequency connection. In the figures, a non-limiting example of a hardwire connection 160 is shown. In one embodiment, device 131 is connectable to a docking station (not shown) to further enable communication between device 131 and system 100. Any docking station or docking means known in the art can be used. That is, when the device is connected to the docking station, a link is established between the device and system 100.

In one embodiment, the processor generates classification 162 for the account according to history 110. In another embodiment, metric 164 is used by the processor to generate the classification. Metric 164 can be any metric known in the art and the metric can be part of any classification system known in the art in order to result in classification 162. For example, in one embodiment, the intent of classification 162 is to place the account in a hierarchy of candidacy for desired transactions or incentives. For example, the more favorable the comparison, the higher the customer's position in the hierarchy and the more valuable or attractive the desired transactions or incentives potentially available to the customer. Thus, the incentive can be made more or less valuable or attractive according to the classification.

In one embodiment, classification 162 is used by the processor: to generate or modify the desired transaction, the incentive, or the metric; to compare the transaction history with the metric; or to transmit the desired transaction or incentive. For example, the classification can be an indication of how favorably the account is transacting with the business entity, for example, with respect to parameters regarding revenue or profitability for the business entity. Thus, for example, accounts with a more favorable classification can be offered more attractive desired transactions or incentives. In another embodiment, the processor uses the AIP to generate or modify metric 164 or classification 162.

In one embodiment, the desired transaction includes a good or service (not shown) offered by the business entity and the incentive can be an offer related to the good or service. The good or service can be any good or service known in the art. The following commonly-owned U.S. patent applications are applicable to the use of the AIP and or the rules described supra to generate an incentive including an offer: U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; commonly-owned U.S. patent application Ser. No. 12/151,038, titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008; commonly-owned U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008; commonly-owned U.S. patent application Ser. No. 12/151,042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application Ser. No. 12/151, 042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application entitled "SYSTEM AND METHOD FOR PROVIDING INCENTIVES TO AN END USER FOR REFERRING ANOTHER END USER", inventors Otto et al., filed Jul. 9, 2008; commonly-owned U.S. patent application entitled "METHOD AND SYSTEM FOR GENERATING A REAL TIME OFFER OR A DEFERRED OFFER", inventors Otto et al., filed Jul. 9, 2008; commonly-owned U.S. patent application entitled "METHOD AND APPARATUS FOR GENERATING AND TRANSMITTING AN IDEAL ORDER OFFER", inventors Otto et al., filed Jul. 9, 2008; commonly-owned U.S. patent application entitled "SYSTEM AND METHOD FOR GENERATING AND TRANSMITTING LOCATION BASED PROMOTIONAL OFFER REMINDERS", inventors Otto et al., filed Jul. 9, 2008; commonly-owned U.S. patent application entitled "SYSTEM AND METHOD FOR LOCATION BASED SUGGESTIVE SELLING", filed Jul. 9, 2008; and commonly-owned U.S. patent application entitled "SYSTEM AND METHOD FOR SCANNING A COUPON TO INITIATE AN ORDER", filed May 2, 2008.

In one embodiment, the processor determines optimization 165 of revenue or profitability for the business entity as a parameter for: generating or modifying the desired transaction, the incentive, or the metric; comparing the transaction history with the metric, or transmitting the respective data. For example, the processor can determine the success of the transactions in history 110 in attaining the optimization of revenue or profitability. Any measure or metric known in the art can be used with respect to the revenue or profitability, including, but not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results. In another embodiment, the processor determines the optimization of revenue or profitability using the AIP.

In one embodiment, metric 126 or metric 164 are with respect to the revenue or profitability of the business entity, including, but not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results.

In one embodiment, the processor is for generating or modifying format or temporal parameter 166 for presentation of the desired transaction or the incentive. For example, the parameter is with respect to a time of day, week, month, or year at which the desired transaction or incentive is presented, or with respect to a frequency with which the desired transaction or incentive is presented. The processor transmits the format or temporal parameter along with the desired transaction and the incentive for presentation. In another embodiment, the processor uses the AIP to generate or modify parameter 166.

In one embodiment, the memory unit stores the transaction history and the AIP; and the processor compares the transaction history with a metric, for example, metric 127, generates, using the AIP and the comparison of the transaction history with the metric, a desired transaction involving the account and the business entity, for example, transaction 128, and generates, using the AIP and the comparison of the transaction history with the metric, an incentive, for example, incentive 122. The rewarding of the incentive is conditional upon execution of the desired transaction. The interface element transmits the desired transaction and the incentive for presentation to a holder of the account.

Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007, is applicable to the operations involving the AIP or any rules, noted supra and infra, for example, generating or modifying the desired transaction, the incentive, or the metric, comparing the transaction history with the metric, or transmitting the desired transaction or incentive or other operations described herein with respect to the AIP.

System 100 can generate, determine, modify, or manage the following:

1. Customer ratings, for example, classification 162, that is, a score or rating given to each customer to determine the type of desired transaction or incentive for which the customer qualifies. The rating can be adjusted based on:
    a. the transaction total of one or more transactions, for example, as found in the transaction history
    b. temporal parameters, such as the time since the last transaction
    c. use of coupons
    d. purchase of discounted or non-discounted products
    e. purchase of loss leaders
    f. any other metric to determine how profitable a customer, or a transaction associated with the customer, is for a business entity operating or benefiting from system 100
2. Incentive modification, for example, the augmentation of incentive 122 or 130. That is, an incremental, additive incentive, for example, discount percent or fixed dollar amount, that is generated or modified and then added to encourage compliance with the desire transaction
3. Maximum discount. That is, the maximum incentive, for example, percent or fixed dollar discount, that can be applied to any desired transaction
4. Grace period. That is, temporal parameters governing compliance of the customer, for example, the amount of time given to comply with a desired transaction
5. Adjusting an incentive discount and determining when to apply the discount
6. Presentation, that is, how the desired transaction and incentive are outputted and conveyed to customer, for example, print a coupon or output email based on whether or not customer has a frequent shopper card
7. Rules governing incentives, for example, discounts, given to loyal customers
8. Rules defining a loyal customer
9. Price of incentive or discount
10. Time between transactions
11. Incentive or discount amount The discussion in commonly-owned U.S. patent application Ser. No. 11/983,679, filed Nov. 9, 2006 and entitled "Method and System for Generating, Selecting, and Running Executables in a Business System Utilizing a Combination of User Defined Rules and Artificial Intelligence" is applicable to the modification of incentives 122 or 130, or the desired transaction by the processor.

As disclosed in commonly-owned U.S. patent application titled: "METHOD AND APPARATUS FOR GENERATING AND TRANSMITTING AN IDEAL ORDER OFFER," inventors Otto et. al, filed Jul. 9, 2008, which application is incorporated by reference herein, in one embodiment, the processor reviews the transaction history to identify an item or service not included in the history (and presumably never ordered by the customer) or ordered by the customer at less than a predetermined frequency. Then, the processor, using the AIP, optimizes the desired transaction and the incentive, for example, by including an upsell in the incentive for an item or service not included in the information or ordered at less than a predetermined frequency. In another embodiment, this pairing is used to realize the optimization of revenue or profits for the business entity.

It should be understood that various storage and removal operations, not explicitly described above, involving memory 104 and as known in the art, are possible with respect to the operation of system 100. For example, outputs from and inputs to the general-purpose computer can be stored and retrieved from the memory elements and data generated by the processor can be stored in and retrieved from the memory.

It should be understood that system 100 can be operated by the same business entity operating or owning a business location using the system, or can be operated by a third party different than the business entity operating or owning the business location using the system. In one embodiment, a third party operates system 100 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 13, 2007.

It should be understood that system 100 can be integral with a computer operating system for a business location, for example, location 116 or with a business entity operating the business location. It also should be understood that system 100 can be wholly or partly separate from the computer operating system for a retail location, for example, location 116, or with a business entity operating the business location.

It should be understood that although individual rule sets and a single artificial intelligence program are discussed, various of the individual rule sets can be combined into composite rules set (not shown). Further, the functions described for AIP 124 can be implemented by combinations of separate AIPs (not shown). Any combination of individual rule sets or artificial intelligence programs is included in the spirit and scope of the claimed invention.

In general, system 100, and in particular, the processor using the AI program, operates to use artificial intelligence, for example, a generic algorithm, to inform or make some or all of the decisions discussed in the description for FIG. 1. In one embodiment, system 100 generates or modifies the desired transaction, the incentive, or the metric, compares the transaction history with the metric, or transmits the desired transaction or incentive, or performs the other operations described herein to attain or maximize an objective of the business entity, for example, performance with respect to metric 126. Factors usable to determine an objective can include, but are not limited to: customer acceptance rate, profit margin percentage, customer satisfaction information, service times, average check, inventory turnover, labor costs, sales data, gross margin percentage, sales per hour, cash over and short, inventory waste, historical customer buying habits, customer provided information, customer loyalty program data, weather data, store location data, store equipment package, POS system brand, hardware type and software version, employee data, sales mix data, market basket data, or trend data for at least one of these variables. Thus, the present invention, for example, system 100, specifically, computer 108 and processor 106, use artificial intelligence, for example, AIP 124 to automatically generate or modify operations, parameters, and outputs with respect to a goal, for example, a metric such as metric 127 and automatically adapts the generation or modification operations, parameters, and outputs to feedback, that is, the present invention is self-learning and self-adapting with respect to generating or modifying operations, parameters, and outputs. Further, the present invention can automatically generate or modify the goal and be self-learning and self-adapting with respect to the goal.

Figure 2:
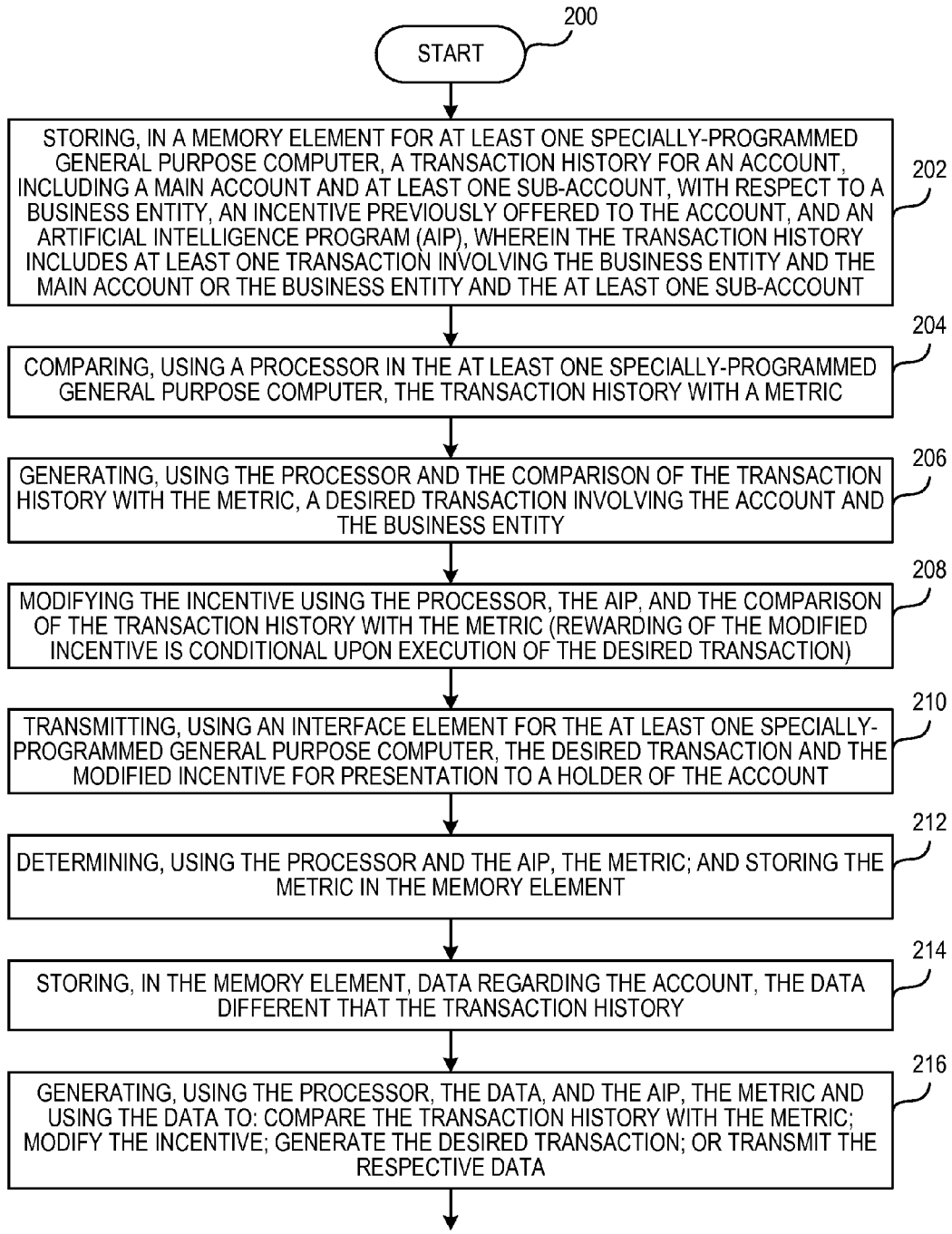
FIG. 2 is a flow chart of a present invention method for managing an account having at least one sub-account.
Figure 2:
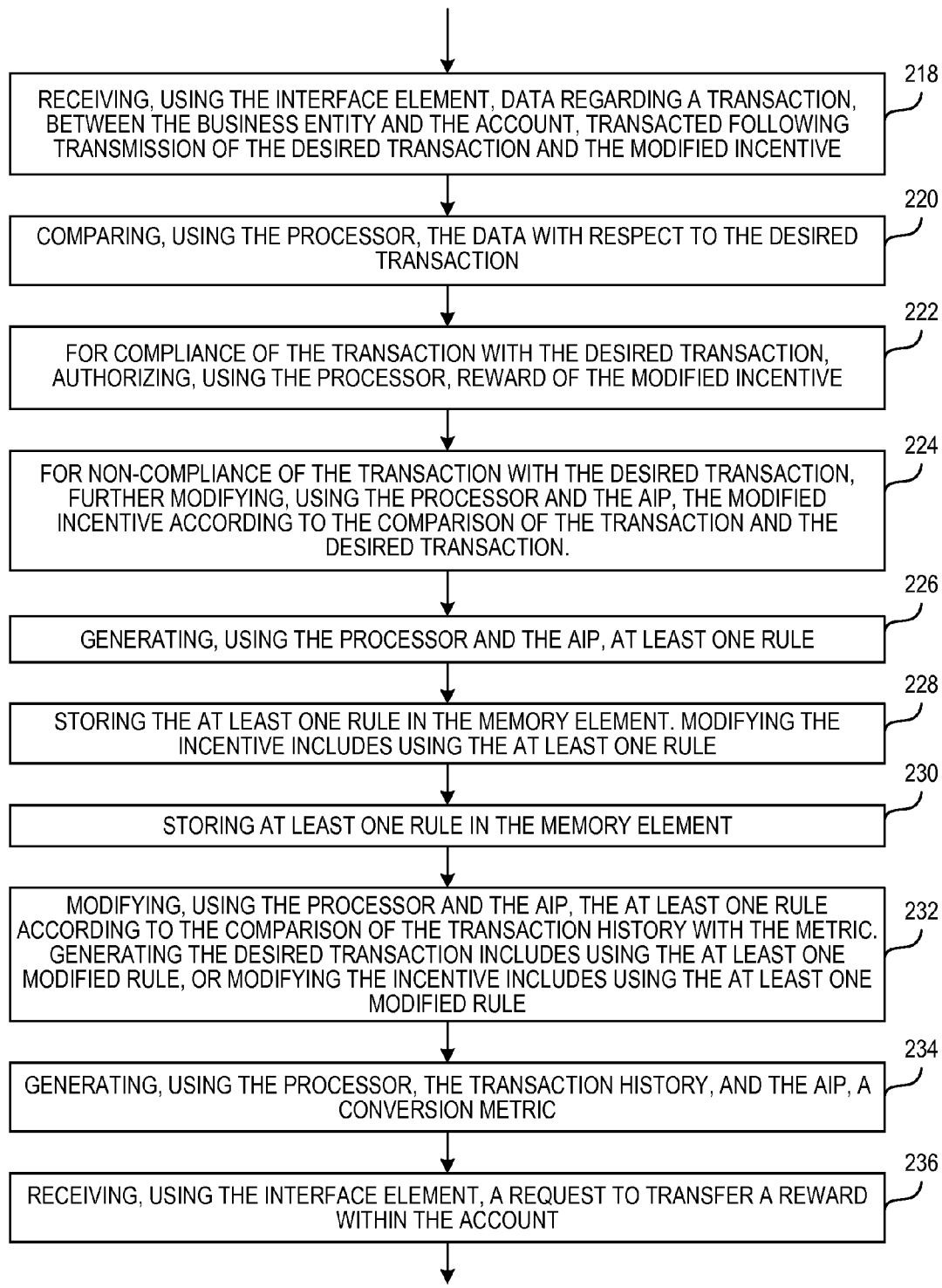
Figure 2:
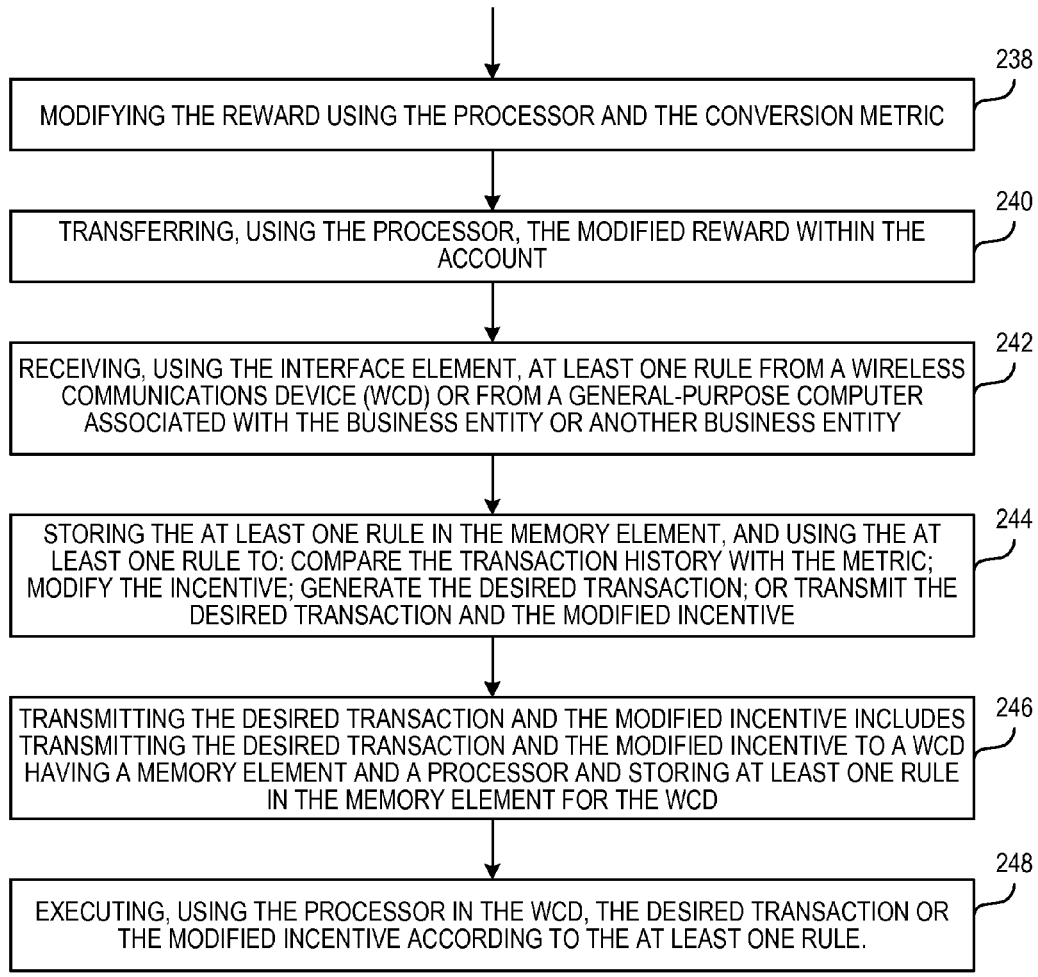

FIG. 2 is a flow chart illustrating a present invention computer-based method for managing an account having at least one sub-account. Although the method in FIG. 2 is depicted as a sequence of numbered steps for clarity, no order should be inferred from the numbering unless explicitly stated. The method starts at Step 200. Step 202 stores, in a memory element for at least one specially-programmed general purpose computer, a transaction history for and account, including a main account and at least one sub-account, with respect to a business entity, an incentive regarding the business entity previously offered to the account, and an artificial intelligence program (AIP). The transaction history includes at least one transaction involving the business entity and the main account, or the business entity and the at least one sub-account; step 204 compares, using a processor in the at least one specially-programmed general purpose computer, the transaction history with a metric; step 206 generates, using the processor and the comparison of the transaction history with the metric, a desired transaction involving the account and the business entity; step 208 modifies the incentive using the processor, the AIP, and the comparison of the transaction history with the metric (rewarding of the modified incentive is conditional upon execution of the desired transaction); and step 210 transmits, using an interface element for the at least one specially-programmed general purpose computer, the desired transaction and the modified incentive for presentation to a holder of the account.

In one embodiment, step 212 determines, using the processor and the AIP, the metric, and stores the metric in the memory element. In another embodiment, step 214 stores, in the memory element, data regarding the account, the data different than the transaction history; and step 216 generates, using the processor, the data, and the AIP, the metric; comparing the transaction history with the metric includes using the data; modifying the incentive includes using the data; generating the desired transaction includes using the data; or transmitting the desired transaction and the modified incentive includes using the data. In a further embodiment, comparing the transaction history with the metric includes using the AIP. In yet another embodiment, generating the incentive comprises using the processor and the AIP.

In one embodiment, step 218 receives, using the interface element, data regarding a transaction, between the business entity and the account, transacted following transmission of the desired transaction and the modified incentive; step 220 compares, using the processor, the data with respect to the desired transaction; and step 222, for compliance of the transaction with the desired transaction, authorizes, using the processor, reward of the modified incentive; or step 224, for non-compliance of the transaction with the desired transaction, further modifies, using the processor and the AIP, the modified incentive according to the comparison of the transaction and the desired transaction.

In one embodiment, step 226 generates, using the processor and the AIP, at least one rule; and step 228 stores the at least one rule in the memory element. Modifying the incentive includes using the at least one rule. In another embodiment, step 230 stores at least one rule in the memory element; and step 232 modifies, using the processor and the AIP, the at least one rule according to the comparison of the transaction history with the metric. Generating the desired transaction includes using the at least one modified rule, or modifying the incentive includes using the at least one modified rule.

In one embodiment, step 234 generates, using the processor, the transaction history, and the AIP, a conversion metric; step 236 receives, using the interface element, a request to transfer a reward within the account; step 238 modifies the reward using the processor and the conversion metric; and step 240 transfers, using the processor, the modified reward within the account.

In one embodiment, step 242 receives, using the interface element, at least one rule from a wireless communications device (WCD) or from a general-purpose computer associated with the business entity or another business entity; step 244 stores the at least one rule in the memory element, and comparing the transaction history with the metric includes using the at least one rule; modifying the incentive includes using the at least one rule; generating the desired transaction includes using the at least one rule; or transmitting the desired transaction and the modified incentive includes using the at least one rule. In another embodiment, transmitting the desired transaction and the modified incentive includes transmitting the desired transaction and the modified incentive to a WCD having a memory element and a processor, and step 246 stores at least one rule in the memory element for the WCD. Step 248 executes, using the processor in the WCD, the desired transaction or the modified incentive according to the at least one rule.

The following describes a present invention method for managing an account having at least one sub-account. Although the method is presented as a sequence of steps for clarity, no order should be inferred from the sequence unless explicitly stated. A first step stores, in a memory element for at least one specially-programmed general purpose computer, a transaction history for the account with respect to a business entity and an artificial intelligence program (AIP), wherein the transaction history includes at least one transaction involving the business entity and the main account or the business entity and the at least one sub-account; a second step compares, using a processor in the at least one specially-programmed general purpose computer, the transaction history with a metric; a third step generates, using the processor, the AIP, and the comparison of the transaction history with the metric, a desired transaction involving the account and the business entity; a fourth step generates, using the processor, the AIP, and the comparison of the transaction history with the metric, an incentive, rewarding of the incentive conditional upon execution of the desired transaction; and a fifth step, transmits, using an interface element for the at least one specially-programmed general purpose computer, the desired transaction and the incentive for presentation to a holder of the account.

The following should be viewed in light of FIGS. 1 and 2 and any discussion provided supra. Although the following non-limiting discussion is directed to a present invention system, it is understood that the discussion also is applicable to a present invention method. System 100 can be described as a reward program for an account including a number of sub-accounts contained under one main account. In one embodiment, each sub-account gains rewards that are tracked under the main account. The system can output special reward offers, for example, incentives 122 and 130, to the main account and sub-accounts to motivate purchasing behavior, for example, to motivate execution of the desired transaction. The system can track the success of the offers, for example via the transaction history or input 134, and automatically modify subsequent desired transactions and incentives based on the success of previous desired transactions and incentives utilizing artificial intelligence, for example, genetic algorithms or AIP 124, and feedback techniques. In another embodiment, rules are used in conjunction with the artificial intelligence.

In one embodiment, the system scores main and sub-accounts and places various accounts into various classes, for example, classification 162. In another embodiment, the processor uses artificial intelligence and the transaction history or classification to identify like accounts and to generate or modify the same or similar desired transactions or incentives for accounts so identified.

In one embodiment, the system is configured to offer up front rewards in exchange for commitments from the main or sub-accounts to execute desired transactions over time. Penalties can be applied to the account if the account is non-compliant with the commitment. In another embodiment, the processor, and in a further embodiment, using the AIP, generates or modifies one or more of the following, for example, using the transaction history:
1. the upfront reward to the main or sub-account holders
2. the required commitment
3. the penalty for non-compliance with the commitment
4. the penalty adjustment
5. the grace period before a penalty is applied to non-compliant behavior In one embodiment, the processor, and in another embodiment, using the AIP, generates or modifies the incentive according to one or more of the following:
1. payment type, for example, credit card usage
2. frequency of transactions, for example, purchases from the business entity
3. number of sub-accounts present
4. check size, for example
5. bonus items in purchase The following is a non-limiting example of the present invention. A main, or master, account holder, Jim, has three sub-account holders registered: Peggy, Sue, and Billy. The system tracks purchasing behavior, for example, using the transaction history, and determines that Jim has shopped with Peggy three times, Sue two times and Billy one time (each shopping event is considered a transaction) in the previous month. The system generates an incentive, for example, incentive 122, and a desired transaction for transmission to Jim and Billy. The desired transaction is three transactions including both Jim and Billy in the next month. The incentive is 200 bonus points for Billy, 200 bonus points for Jim, and 100 bonus points each for Peggy and Sue. The system then determines if Jim and Billy shopped three times in the subsequent month, for example, using input 134 and the transaction history. If Jim and Billy have not executed the desired transaction (three transactions in the subsequent month), the system initiates an iterative process to entice Jim and Billy to comply with the desired transaction(s). For example, the system successively modifies the incentive, for example, generating incentive 130, and successively presents the desired transaction and modified incentive until Jim and Billy comply with the desired transaction. For example, the system successively increases the bonus points offered for compliance with the desired transaction until Jim and Billy execute the desired transaction.

In another non-limiting example of the present invention, the system determines, for example, using the transaction history, that Jim typically has had no more than two sub-account holders present with him during past transactions. To encourage the participation of more sub-accounts, the system generates an incentive, for example, incentive 122, to reward Jim with 200 bonus points if Jim is compliant with a desired transaction consisting of three sub-account holders participating in at least two of Jim's transactions for the next month. The incentive can be modified as described above to encourage Jim's compliance if the system determines that Jim is being non-compliant, for example, by using input 134 and the transaction history.

In one embodiment, credit card embodiment rewards are allocated on a website after execution of a desired transaction. In another embodiment, transferring reward points from a main to a sub-account or from one sub-account to another includes use of a conversion metric, for example, bonus or penalty for transferring. The master account holder, or a sub-account holder with permissions, can log in to a website and allocate reward points earned from making purchases at one or more retailers.

In one embodiment, at a retail buying club, for example, Sam's Club, a master account holder can check in at the door via a hand held device that prompts the master account holder to enter the sub-account holders that are present. The store employee operating the handheld device can verify that the sub-account holders registered as present by the master account holder are actually present. In another embodiment, a fraud system can detect if there are too many sub-accounts in a party based on the transaction amount and adjust reward retroactively.

In one embodiment, a master account holder can use a WCD, for example, a cell phone or other handheld device to process the transaction. If the master account holder is registered in the reward program, a prompt can be sent from the central system to the master account holder device prompting the registration of sub-account holders available. Email notifications and offers can be sent to the master account holder device, and also to devices of sub-account holders. Commonly-owned U.S. patent application Ser. No. 11/985,268, filed Nov. 14, 2007 and commonly-owned U.S. patent application Ser. No. 12/008,428, filed Jan. 11, 2008 are applicable to the operations described above for a WCD.

In one embodiment, for any or all of those instances of a present invention system or method in which an artificial intelligence program or generic algorithm is used, a rule or set of rules, for example, rule 136, is used in conjunction with the artificial intelligence program or generic algorithm. The operation of an artificial intelligence program or generic algorithm with a rule or set of rules is described in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

The present invention leverages existing or future marketing systems, marketing programs, loyalty programs, sponsor programs, coupon programs, discount systems, incentive programs, or other loyalty, marketing, or other similar systems, collectively, "marketing systems" by adding programming logic, self-learning, and self-adaptation to generate or modify a desired transaction or incentive, with respect to managing accounts, for motivating a desired behavior by a customer. The present invention can use any, all, or none of the following considerations as part of generating or modifying the desired transaction, the incentive, or the metric, comparing the transaction history with the metric, or transmitting the desired transaction or incentive, for example, by adding programming logic, self-learning, and self-adaptation as noted supra:

1. One or more business, customer or sponsor objectives, for example, metric 126.
2. Temporal parameters, such as, time of day, day of week, month, or year.
3. Any one or more data or variables available or accessible, including, for example, any customer, business or sponsor information, such as, membership in a loyalty or other marketing program, ordering preferences or history, current sales volumes or budgets or targets, current or planned local, regional or national marketing programs or objectives, device preferences, current speed of service, quality of service or other operating data, budgets, objectives or trends, etc.

In one embodiment, the present invention employs any, all, or none of the following considerations as part of generating or modifying the desired transaction, the incentive, or the metric, comparing the transaction history with the metric, or transmitting the desired transaction or incentive, for example, by adding programming logic, self-learning, and self-adaptation as noted supra:

1. Parameters or data regarding the customer, for example, using the transaction history or data 132. For example, the incentive can be made more attractive to the customer if the customer is a loyal customer or if the business entity wishes to entice the customer to purchase a good seldom ordered by the customer in the past. Proclivity to accept or reject offers of the same or other types. Customer objectives also can be considered.
2. The customer class or type. For example, the incentive can be made more attractive to the customer if the customer is grouped with loyal customers or if the business entity wishes to entice the customer group to purchase a good seldom ordered by the customer group in the past. Customer group objectives also can be considered.
3. Temporal parameters, such as the time of day, week, month, or year. For example, the system can reduce prices in the incentive to encourage sales during times of historic low sales volume or increase prices in the incentive during times of historic high sales volume.
4. The good or service involved in a past, current, or possible future transaction between the customer and the business entity. For example, incentives for items with a short shelf life can be made more attractive to encourage a larger volume of orders for the items.
5. Inventory on hand. For example, incentives can be modified to encourage sale of overstocked items or to maximize profits for items in short supply.
6. Specifics of a transaction. With the use of the AIP, system 100 can automatically, dynamically, and intelligently adapt the desired transaction or the incentive to any parameter associated with a particular transaction. Further, the parameters to which the system is to adapt the price can be automatically, dynamically, and intelligently selected or modified.
7. Physical parameters of the transaction process. For example: order entry device, e.g., point of sales (POS) terminal, kiosk, cell phone, PDA, laptop, IED, etc.; POS device or station, e.g., front counter, drive through, retail station, call center, location on counter, e.g., first station vs. second, third fourth or other station, etc.; output display device (e.g., customer facing display, kiosk, cell phone, PDA, laptop, IED, etc.); or in a quick serve restaurant, the desired transaction or the incentive can be modified to encourage use of self-service kiosks, which may optimize revenue for the business entity, or to discourage use of a point of sales station attended by an employee.
8. Rate of sale of items. For example, prices in the incentive can be increased for goods that are selling rapidly or reduced for goods that are selling slowly.
9. Reservations. For example, to encourage customers to make reservations at a sit down restaurant, prices in the incentive can be reduced for orders placed by customers making reservations.
10. Regular orders. For example, based on the transaction history, prices in the incentive for a restaurant can be reduced for items regularly ordered by a customer or prices can be reduced on items rarely ordered by a customer to encourage the customer to order the rarely ordered items.
11. Employee. For example, to increase prices for incentives handled by an employee with a high success rate of handling such incentives.
12. The nature of the transaction, for example, determining feasible upsells to include in the desired transaction.
13. The location at which the transaction is occurring, for example, lowering the price in the incentive to encourage patronage at a location.
14. Business Information or objectives, for example, metric 126.
15. Sponsor Information or objectives.
16. Marketing Program Type.
17. Opt In Information.
18. Payment method or terms or conditions of payment.
19. Marketing Message Contents.
20. Marketing Offer Objectives.
21. Expected or Actual System Results or tracking data.
22. System determined discounts or other incentives required to achieve desired results.
23. One or more table entries provided by one or more end users, for example, a system administrator.
24. One or more rules provided by one or more end users, for example, a system administrator.
25. One or more genetic algorithms or other AI based rules or determination methods.
26. Point within transaction, e.g., pre-order, mid-order, post order, etc.
27. Loyalty program information.

28. Current store activity, e.g., high or low volumes of transactions.
29. Customer survey information.
30. Financial considerations, such as total current price/profit, total expected price/profit, regular or discounted price, gross margins, profit margins, labor rates, labor availability, marketing funds available, or third party funds available, budget.
31. Expectation of accept or reject of one or more offers in the desired transaction at one or more price points in the incentive.
32. Current, prior or expected level of dilution, gaming, fishing, accretion.
33. Business, customer, or employee target goals.
34. Current or planned local, regional or national or other marketing campaigns, including, for example, product introductions, price or other promotions, print, radio or television or other advertisements, e.g., newspaper coupon drops, etc.
35. Business, customer, sponsor, or system objectives.
36. Business, customer, sponsor, third party, or system information.
37. Any other information, data, rules, system settings, or otherwise available to the marketing system or disclosed invention or the POS system or other system designed to deliver one or more marketing messages, offers, or coupons, etc.
38. Any combination or priority ranking of any two or more of the foregoing.

In one embodiment, marketing messages, content, desired transactions, metrics, histories, incentives, or other parameters, are created or maintained centrally or in a distributed network, including, for example, locally. Such management may be accomplished via any applicable means available, including, for example, making use of existing, e.g., off the shelf or customized tools that provide for such creating, management or distribution.

In another embodiment, in an effort to further enhance generating or modifying the desired transaction, the incentive, or the metric, comparing the transaction history with the metric, or transmitting the respective data, or to otherwise improve one or more aspects of the present invention, the invention may access certain information from existing systems, including, for example, existing POS databases, such as customer transaction data, price lists, inventory information or other in or above store, for example, location data, including, but not limited to data in a POS, back office system, inventory system, revenue management system, loyalty or marketing program databases, labor management or scheduling systems, time clock data, production or other management systems, for example, kitchen production or manufacturing systems, advertising creation or tracking databases, including click through data, impressions information, results data, corporate or store or location financial information, including, for example, profit and loss information, inventory data, performance metrics, for example, speed of service data, customer survey information, digital signage information or data, or any other available information or data, or system settings data.

In one embodiment, each location associated with the present invention establishes its own rules, uses its own AIP or generic algorithm, or learns from local customer behavior or other available information. In another embodiment, the present invention shares some or all available information or results data among any two or more or all locations or locations that fall within a given area, region, geography, type, or other factors, such as customer demographics, etc., and makes use of such information to improve the present invention's ability to perform present invention operations described supra and infra.

For example, when using an AI based system, such as disclosed in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007," one location may discover or otherwise determine that a certain type or class of desired transaction or incentive is particularly effective. By sharing such information among other locations, for example, similar locations, the present invention can begin to make use of the same or similar desired transactions or incentives in other generally similar locations or with similar customers or classifications of customers so as to improve the performance of one or more other such locations or all locations. In this fashion, the present invention can learn which desired transactions or incentives more quickly or generally achieve the desired results or improve trends towards such results. Likewise, the present invention can more quickly determine which desired transactions or incentives do not yield the desired results or determine how long such desired transactions or incentives are required to achieve the desired results.

In a further embodiment, desired transactions or incentives are provided or subsidized by one or more third parties, including, for example, third party sponsors. For example, a vendor supplying an item in a desired transaction could subsidize an incentive to encourage acceptance of the item. In another example, such an offer may be partially or fully subsidized by an unrelated third party sponsor. For example, as part of a desired transaction, a telecommunications company offers to view an advertisement for the telecommunications company or fill out a survey or perform some other action or accept a subsequent or related optional or required offer, etc.

In one embodiment, customers are grouped by the processor according to similarities in transaction history or other customer information, for example, using and history 110 or data 132. The system generates or modifies the desired transaction, the incentive, or the metric, compares the transaction history with the metric, or transmits the desired transaction or incentive for use with the grouped customers.

In one embodiment, the operations of the processor and the AIP, described supra and infra, include the generation of executables as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, the present invention generates or modifies the desired transaction, the incentive, or the metric, compares the transaction history with the metric, or transmits the respective data based upon other performance data or results, for example, the transaction history. In another embodiment, the present invention determines the impact of transaction histories, account data, metrics, desired transactions, incentives, or presentations on the ability or proclivity of an employee or customer to game or fish the present invention. The system avoids or ceases transaction histories, account data, metrics, desired transactions, incentives, or presentations and/or changes the type of transaction histories, account data, metrics, desired transactions, incentives, or presentations provided or suppressed. In one embodiment, one or more of the above operations are performed using the AIP.

In one embodiment, transaction histories, account data, metrics, desired transactions, incentives, or presentations vary from employee to employee, from customer to customer, from account to account, or from time to time, or one or more of these may be consistent regardless of the employee, customer, account, or time or other information. In a another embodiment, where transaction histories, account data, metrics, desired transactions, incentives, or presentations vary, such transaction histories, account data, metrics, desired transactions, incentives, or presentations are determined via any applicable means and using any available information to make such determination, including, for example, any available customer, account, business, or sponsor information or any one or more customer, account, business, or sponsor objectives or any combination of the forgoing. In a further embodiment, transaction histories, account data, metrics, desired transactions, incentives, or presentations are further determined or modified based upon information or needs or business objectives of one or more suppliers or competitors of such suppliers. For example, if a WCD is within a geographical area for a location selling competing items A and B, a desired transaction and incentive are generated and transmitted for one or both of the items and vendors for the items underwrite the cost for the price to the business entity. In one embodiment, one or more of the above operations are performed using the AIP.

In one embodiment, a present invention system generates, modifies, or uses transaction histories, account data, metrics, desired transactions, incentives, or presentations based upon current or previous buying habits or any other available information regarding a customer. If for example, an end user is a loyal customer for item A, the present invention can increase the price in the incentive for item A or decrease the price in the incentive for a different item depending upon any known factors, for example, did the customer receive or act upon an offer for item B. If the customer did receive or act upon a reminder for item B, in another embodiment, the present invention reduces a cost in the incentive for item A as a blandishments to purchase item A instead of item B, or matches or beats a price for item B, or queries such loyal (or other) customer to determine what price such customer would require to purchase item A. In this fashion a competitive environment is created.

In one embodiment, the end user of a present invention system modifies the rules or method of operation so as to favor itself. For example, in the previous example, if the producer of item A were the sole end user of the present invention, the producer may choose to not share any part or all of any such customer information or may use knowledge of any reminder regarding item B to its benefit. In another example, if a grocery chain was the sole end user of the present invention, the end user may choose to provide equal access to the present invention or favor one or more of its suppliers based upon any one or more of its business objectives, for example, the profitability or perceived or actual quality or consistency or pricing of such one or more suppliers. In one embodiment, one or more of the above operations are performed using the AIP.

In one embodiment, in order to receive a desired transaction and incentive, account holders, for example, existing or prospective customers are required to opt in to a cellular marketing program or some other loyalty program indicating their desire or providing permission for such marketing system or the business entity to send one or more such desired transaction and incentive. In this fashion, only those interested in such communications will be sent such communications.

In a further embodiment, the desired transaction or incentive is modified for prospective customers having an identity previously provided by an existing customer, as described in commonly-owned U.S. patent application Ser. No. 12/217,863, titled: "SYSTEM AND METHOD FOR PROVIDING INCENTIVES TO AN END USER FOR REFERRING ANOTHER END USER," inventors Otto et al., filed Jul. 9, 2008, which application is incorporated by reference herein. For example, if an existing quick service restaurant chain customer provides one or more prospective customer's identity, when such prospective customer is identified during a transaction at a quick service restaurant chain's participating locations, the present invention generates or modifies the desired transaction or incentive or presentation of the desired transaction or incentive to encourage participation in the program and provides the identity of the referring party along with such desired transaction or incentive. In one embodiment, one or more of the above operations are performed using the AIP.

In one embodiment, the present invention improves results over time or with use of the invention. Such improvement or optimization can be accomplished via any means necessary including any of several methods well known in the art or as disclosed by applicants and incorporated herein by reference, including, for example, commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; and commonly-owned U.S. patent application titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008. For example, statistical methods can be used to determine which transaction histories, account data, metrics, desired transactions, incentives, or presentations generally yield the desired or optimal or generally better results, or such results may be determined using artificial intelligence, for example, one or more genetic algorithms, or a present invention administrator/operator can review results reports and then provide manual weighting criteria to further define or control the present invention, or a combination of these and other well known methods may be employed in any combination or in any order or priority.

In one embodiment, a present invention incentive includes a discount. Such discounts can be associated or applied to specific items, or to an entire order. In one embodiment, discounts are determined based upon rules established by management of the present invention or as established or modified from time to time by any authorized personnel, or may be initially established or modified using a learning system, e.g., a genetic algorithm. In any such case, the present invention can make use of any or all available information, including, but not limited to transaction history and customer information. Discounts can be designed to maximize, minimize or optimize any one or more business or customer objectives as desired or indicated. In another embodiment, the discount, if any, is presented to the customer as a percentage discount or as a cents or other amount off discount. In one embodiment, one or more of the above operations are performed using the AIP.

In one embodiment, discounts in incentives are used/tried relatively sparingly to determine the price elasticity of customers, both as a whole and/or by class, group, demographics, type or order contents, base order amounts, and/or specific customer's buying habits and acceptance/rejection information. In this fashion, the present invention can, over time, yield optimal results by learning or otherwise determining what price reductions, if any, are required given the known information. For example, if a sub-account rarely transacts with the main account, the present invention could include a price offering a 10% discount in the incentive if the sub-account and the main account are involved in the same transaction. If the account holders reject such offer, the present invention could offer a larger discount in the incentive, for example, for a 20% discount. Once the present invention determines account holder price points, and/or holders become habituated to executing the desired transaction, the present invention can reduce or eliminate related discounts or other incentives. In one embodiment, one or more of the above operations are performed using the AIP.

In one embodiment, the present invention, having acquired data regarding customer price elasticity and other information, uses such information to determine other prices for the same or generally similar customers, e.g., other customers who purchase one item but not typically another. In another embodiment, using such logic, the present invention determines classifications of customers and leverage use of such information by providing a desired transaction or incentive that is also optimized from the location or location management perspective/objectives. In one embodiment, one or more of the above operations are performed using the AIP.

In one embodiment, an administrator can add or change or otherwise modify the previous listing, or data, or determine the order of priority or preference of each such discrimination factors or preferences or data, including, for example, location, payment or device, ranking each in order of such preference or providing table, rules or other entries to provide or assist or to support determining which are preferred or the amount of incentive available or increased or decreased incentive, as a percentage or absolute or relative or other dollar or other calculation method to determine what price modifications, if any to make, at which locations, devices or payment methods or other discriminating factors, for example, customer or business preferences or customer, business, sponsor or other entity information, objectives, rules or other available information or rules or system settings. By providing or otherwise manually or automatically determining such rankings, the disclosed invention can initially or continuously evaluate potential pricing and modify such pricing or provide other incentives to drive a desired percentage of business or customer transactions to one or more particular devices, locations or payment methods. In one embodiment, one or more of the above operations are performed using the AIP.

In one embodiment, the present invention provides such incentives initially, or on an ongoing basis or only until certain objectives are achieved or certain customers or all customers are generally habituated to compliance, for example, with a business objective such as a minimum check size, after which, in certain embodiments, the present invention may cease, temporarily or permanently making such price incentives based upon such discriminating factors, or may reduce the difference in incentives, or may only periodically provide such full discounts or reduced discounts so as to reinforce such behavior. In another embodiment, a system administrator or other end user establishes such rules or conditions. In one embodiment, one or more of the above operations are performed using the AIP.

In one embodiment, the present invention makes such determinations using an automated means. Such automated means includes, for example, a system that periodically or generally continuously tests different transaction histories, account data, metrics, desired transactions, incentives, or presentations or other methods, for example, user interfaces, or other benefits or incentives, and based upon such testing, determine which transaction histories, account data, metrics, desired transactions, incentives, or presentations or other benefits yield the desired compliance, for example, with a business objective such as a preferred payment method. Such automated system may periodically cease providing such incentives once it is determined that the desired customer behavior has been established, habituated or otherwise persists without need for such continued incentive. If such system subsequently determines that the desired behavior has ceased or fallen below a desired level, such system can then reinstate an appropriate incentive. When reinstating such incentive, for example, via transaction histories, account data, metrics, desired transactions, incentives, or presentations, the present invention can return to previously successful levels or can provide different transaction histories, account data, metrics, desired transactions, incentives, or presentations, on a temporary, periodic or permanent basis. Such reinstatement may be provided for all customers, certain customers, classes of customers, or only those customers that have ceased or have generally reduced their frequency of desired behavior. In one embodiment, one or more of the above operations are performed using the AIP.

In one embodiment, the present invention tests transaction histories, account data, metrics, desired transactions, incentives, or presentations or provides certain pricing on a periodic basis within a single location or among a plurality of locations so as to determine the extent or requirement regarding any such transaction histories, account data, metrics, desired transactions, incentives, or presentations or other benefits. For example, by testing incentive levels, the present invention can determine the level of incentive needed to attain a business goal, or such a system can further determine the extent of any gaming, dilution, diversion or accretion. By alternating offering and not offering incentive modification or by testing various levels of incentives, the present invention can better determine the optimal incentive, discount or benefits required, if any, to achieve the desired results, while minimizing or mitigating any undesirable effects of using or deploying such system. Such testing can be accomplished via any applicable or available means, including those previously disclosed by applicants herein and within the referenced applications, or randomly or using rules or AI based systems. By periodically testing or making changes to such transaction histories, account data, metrics, desired transactions, incentives, or presentations or benefits, the present invention can continually strive to achieve the optimal mix and level of transaction histories, account data, metrics, desired transactions, incentives, or presentations. By combining the use of one or more of a table, rules or AI based system, including, for example, as disclosed in the applications incorporated by reference herein, a more effective, responsive, adaptive, and dynamic marketing system may be developed and deployed that achieves optimal or nearly optimal results over both the short and long term.

In one embodiment, the present invention tests customers of one or more locations using, an incentive, for example, discounted pricing, while maintaining the regular prices at one or more other locations. By comparing the results data from such test and control groups of locations, the present invention can better determine which incentives are accretive or provide net benefit or are subject to gaming, fishing or other fraudulent or undesirable activities. Such testing can be performed within a single unit as well, by periodically offering such incentives to the same or similar customers or by randomly providing or not providing such incentives.

In one embodiment, the present invention makes use of a combination of such testing methodologies in order to best determine which desired transactions or incentives yield optimal or the best results given the present invention information, parameters or any one or more customer, business, sponsor or present invention objectives. For example, the present invention tests in a single or group of stores certain new or untested desired transactions or incentives, and, combines such test with a periodic modification of desired transactions or incentives, for example, toggling, between higher and lower price discounts, which toggling, may be random, 50/50, or may be intelligently determined, for example, using the AIP, based upon system information, and continue such test for a period of time, for example, one month, while comparing results of such tests with a similar number of stores in a control group, and then, switch the process, for example, test within the original control group and stop offering modified incentives within the original test group. In this fashion the present invention determines the effects of desired transaction or incentive modifications and the effect of such modifications on customers, customer buying habits, store or business results, or any other measures, including, for example, testing for dilution, diversion, accretion, gaming or fishing. In one embodiment, one or more of the above operations are performed using the AIP.

In one embodiment, a system administrator is able to enter or modify or delete or otherwise provide transaction histories, account data, metrics, desired transactions, incentives, or presentations using an interface provided for such purposes. When establishing messages or content of transaction histories, account data, metrics, desired transactions, incentives, or presentations, such administrator or other end user may be further permitted to designate which transaction histories, account data, metrics, desired transactions, incentives, or presentations are to be generally used when using a particular type of communications. For example, one type of transaction history, account data, metric, desired transaction, incentive, or presentation may be designated for use when communicating via cell phone and another transaction history, account data, metric, desired transaction, incentive, or presentation used for email and still other versions for each or all of the other various methods of communications. In another embodiment, the present invention tests each transaction history, account data, metric, desired transaction, incentive, or presentation with each such communications method to determine, partially or wholly, which transaction history, account data, metric, desired transaction, incentive, or presentation yields the best or optimal results over time or based upon any available information, including, for example, any available or otherwise accessible customer, business or sponsor information or objectives or by tracking actual activities and results or changes in behavior as expected or predicted by customers or other end users or classes or categories of uses or by device, location or payment method. In a further embodiment, one or more of the above operations are performed using the AIP.

The following non-limiting definitions may be applicable to one or more embodiments of this disclosure:

Business—includes any business enterprise formed for the purpose of providing a product or service, which may or may not be for profit.

Business objective—includes any desired outcome of a business or business owner, including, for example, acquisition of new customers, delivery of one or more marketing offers, increases or improvements in product quality or service, sales, profits, customer counts, customer visitation frequency, customer loyalty, average check, average item counts, order contents, speed of service measurements, labor rates, sales per labor hour, year over year or same store sales, percentage market share, annual or periodic growth rates, employee or management retention or turnover rate, inventory control or turns, inventory waste, raw or finished waste, increases in stock prices, improved return on assets or equity, or any other objective as determined by management or other authorized individual or as established by rules or other metrics including or stored in a system designed for such purposes.

Business Information—includes any information that is provided, known, gathered, assumed or is otherwise determined or stored that is related to or is about or otherwise helps understand, define, operate, improve, track or report the performance of, a business, for example, customer acquisition and sales data, marketing information, click-through rates, conversion rates, profit and loss information, accounting information, financial information, statistics and ratios, customer information, sponsor information, information about any one or more business, customer or sponsor objectives, or any other information, business metrics and data gathered or stored or otherwise possessed or accessible by a business and/or any of its affiliates, sponsors, customers or investors.

Controller—means any one or more of the following electronic devices including, but not limited to: cell phones, Personal Digital Assistants or (PDA's), Blackberry or similar devices, such as hand held computers, MP3 players, or any other personal electronic device that has one or more of a keyboard, speaker, microphone, one or more buttons, or any other similar devices that provides a User with Input and/or Output Functionality and Remote Connectivity. A Controller may be or include one or more of a Display and/or a Server or other computing devices or means of computing.

Coupon—includes an offer presented in the form of an electronic or printed ticket or document which may include a discount or rebate when purchasing one or more products from a business or sponsor. In certain embodiments, a coupon may include a bar code, RFID, or other means of identification, which may include information that can verify any one or more of the type of coupon, valid offer dates, customer, business or sponsor information, discount amounts, restrictions, permissions, items required to purchase to receive a discount or rebate, and/or items to which a discount or rebate applies, location information, including where the coupon is valid, e.g., which store or stores, or website, and/or any other information that might assist or be of benefit to the issuer or recipient or the processor, e.g., a cashier, and/or the processing system, e.g., a POS terminal or POS system, and/or a sponsor or other business entity, and/or any information that might encourage distribution, delivery, redemption or use of any such coupon or that might improve the results of any coupon or coupon marketing campaign, e.g., a viral marketing campaign or new product introduction.

Customer Facing Display—includes any device accessible by an end user or customer that includes at least one of a display, input means, e.g., a touch screen or keyboard, or other output means, e.g., a speaker. In certain embodiments, a Customer Facing Display may include a Kiosk, POS Terminal, or other computing device, such as a cell phone, PDA, laptop or PC. In certain embodiments a customer facing display may be a POS or POS terminal and vice versa.

Customer Identifier—includes, but is not limited to a cell phone, an RFID tag, a credit card, a debit card, a frequent shopper card or number, a coupon, a license plate, a check, a loyalty or gift card, fingerprint or other biometric input, a driver's license, or other identification means.

Customer Information—includes any information that is provided, known, gathered, assumed or is otherwise determined or stored that is related to or is about or otherwise helps understand or define a customer and/or a customer's buying habits, preferences or tendencies. Such information may include the customer's (or any related person, e.g., a child) order history, order contents, ideal order acceptance or rejection data, willingness to accept or reject one or more marketing offers or messages (either specific or types or categories of offers), price point or price elasticity, tendency to attempt to game other otherwise attempt to take advantage of the system or marketing program, average order total, e.g., average check, average item count, e.g., average number of items in a given order, average customer count, e.g., how many persons in the party on average, any demographic information, e.g., income, race, mailing address, zip codes, phone numbers, household total income, number of children, age, sex, number and type of internet enabled devices, participation in one or more marketing programs, willingness to use kiosks, cell phones or other ordering devices, prior ordering history, including willingness or tendency to accept pre, mid and/or post order marketing offers, e.g., suggestive selling, cross selling, sponsor rewards, or any other offers, and/or any other information gathered or provided by/from the customer, e.g., preferences information gathered by observing such customer behavior, e.g., does customer switch from cold beverages to hot beverages in the wintertime, and/or information gathered or supplied by a marketing program and/or by such customer when signing up or otherwise maintaining such information in a customer loyalty or other marketing program's database, or by importing or otherwise accessing information about such customer via any public or commercially accessible database and/or any combination of the foregoing information.

Customer Objective—includes any desired outcome, behavior that benefits a customer, including, for example, improved or better pricing, service, e.g., friendly service, speed of service, accuracy of service, quality of delivered products, types of marketing offers and/or savings associated with each, cleanliness of location, type of online or other ordering systems, including, e.g., POS devices, or any other favorable treatment or benefit that can be obtain or otherwise accrues to the benefit of such customer, and/or any combination of the foregoing.

Dilution—includes any outcome that has a net negative effect, e.g., an acceptance of an upsell or other offer results in providing a discount on an item, which a customer might otherwise have paid full price.

Discount—includes any price or offer at an amount other than the standard list price or expected price or shelf price, or displayed price, e.g., online.

Display—includes any one or more of the following electronic devices including, but not limited to: TV (of any technology type, including but not limited to a Plasma Display, LCD, CRT or DLP), Kiosk, LED display, Electronic Shelf Label, Automated Teller Machine (ATM), POS terminal, video game display, video slot machine or other video based casino games, speaker, or any other device capable of displaying, presenting or otherwise outputting or processing Output Materials (such as an LCD or other display in an airline seatback or other Location, e.g., a grocery cart equipped with a display and/or a bar code or RFID printer or reader), including devices that provide a User with Output Functionality. A Display may include or be one or more of a Controller and/or a Server and/or other computing device capable of providing Input and/or Output Functionality and/or Remote Connectivity.

Domain Name Server (DNS)—One or more computers including a cooperatively run set of databases, distributed among several servers, volunteered as repositories for IP address information.

End User—includes any person or entity making use of any one or more of the methods of the disclosed invention, and/or any system that uses or is based upon or benefits from one or more of the disclosed inventions, including, for example, customers, vendors, retailers, QSR operators, managers, employees, supervisors, friends, family members, or any other person as applicable to the given context or otherwise.

Existing Member—includes a member of a loyalty program or other marketing program and/or a person that has signed up for any marketing or other program and/or has provided information to such a program, whether or not such person is aware of such program, including, end users.

Frequent Shopper Program—includes any system that provides one or more rewards to members of such program for purchases made.

Frequency Program—includes any Frequent Shopper Program or other rewards system that rewards customers for their frequency of visit and/or buying one or more products, goods or services.

GUI—includes a graphical user interface, or other means of providing communications from or to an end user, including via graphics, text, audio, video, data input, such as voice, typing, touch screen, or other means of input or output to/from any device, including a POS Terminal, or other computing devices. Such GUI may include information and/or actions that are available for viewing, use or interaction with an end user. Such interaction may be accomplished via any applicable means, including, for example, manipulating icons, widgets or other items or areas displayed on such GUI, including, clicking on one or more hyperlinks, and/or entering information into fields or other areas designed for such purposes, e.g., typing a name, or selecting one or more items from a displayed list, etc.

Header—A numeric code assigned to a request for content by either a LAN or ISP Server, which identifies a requestor's unique Internet Protocol Address. Generally, the Header is used for purposes of accurately returning a requested Markup Language-based electronic document as well as any corresponding files to the requester.

Hyperlink—A text phrase or graphic embedded within a markup language-based electronic file, which corresponds to the address of a site on the World Wide Web.

Input Functionality—includes any one or more of any of the following, including but not limited to any device that includes or provides one or more buttons (e.g., a keyboard) that can convey individual or grouped electrical signals, impulses, commands, or messages, or other tactile or other input device including a joy stick, mouse, touch screen, and/or audio (e.g., voice commands or instructions), bar code scanner, RFID reader, fingerprint or other biometric scanning device, scale, laser pointer, camera, infrared sensor, cell phone, hand held computer or PDA keypad, motion or other "presence" detector, magnetic card or magnetic card reader, and any other input method recognizable by or able to convey information to any one or more of a Display, Server, Controller or other computing device.

Internet—includes the world wide web and the network that is accessible by the public that includes a network of interconnected computers that transmit data using, for example, Internet Protocol (IP). In some aspects, certain private networks, including virtual private networks (VPN) may be included in the definition of the Internet.

Internet Device or Internet Enabled Device—includes any computing device that is capable of accessing or otherwise communicating with or via the Internet or any other network, client/server and/or peer-to-peer or any other network, and/or that is otherwise able to practice or benefit from any one or more of the herein disclosed inventions.

Internet Ordering or Online Purchase—includes the processing, in whole or in part, of any one or more transactions using or otherwise communicating via the Internet or other means of communications by or between any one or more of a business, sponsor and/or one or more customers, which transaction may be for or include the purchase, trade or acquisition of one or more items. In certain embodiments, internet ordering or online purchases may include the delivery of one or more marketing messages or marketing offers.

Item—includes any object, tangible or intangible, which may include any item for sale, rental, lease, consumption, transfer, and/or may be possessed or owned. Item may include any physical or virtual object. In certain embodiments an item may be any one or more of a food item, a beverage item, a dessert item, a retail good, a food product, a device, a POS device, a coupon, clothing, furnishings, groceries, automobiles, motorcycles, lighting, electrical equipment or devices, etc.

Kiosk—includes any device or location that permits a customer or end user to enter part or all of an order and/or respond to a marketing message or offer, with or without the assistance of a third party, e.g., a cashier. Kiosks may include software to prevent end users from performing unauthorized actions and/or accessing the system, operating system or other secure areas of the kiosk and/or systems to which it may be attached or connected, e.g., the Internet or one or more servers, etc.

Location—means and includes, but is not limited to retail stores, restaurants, bars, theme parks, casinos, video game parlors, Internet Cafe's, coffee bars, book stores, gas stations, convenience stores, hotel rooms, hotel or other lobbies, meeting rooms, office buildings, offices, airports, airplanes, government or other public services buildings, hospitals or any other public or private area or facility or residence that contains, possesses or otherwise provides limited or general access to at least one Display and/or practices part or all of any one or more embodiments of the present invention.

Loyalty or Frequent Shopper Member—includes any end user or person that has joined or signed up or opted into a loyalty program and/or frequent shopper program.

Loyalty Member—a person that has signed up for or otherwise participates in a loyalty or frequent shopper program.

Loyalty Program—any system that permits users to sign up to receive rewards based upon such user's purchases or visitation frequency.

Marketing Message—Includes a marketing offer, or any other communication with an end user, e.g., a customer, which message may include any one or more of the following such as, any one or more of a graphic, logo, icon, price, discount or other offer, video, audio, or other visual, audio or static marketing or other content designed to communicate with or otherwise inform, educate or persuade a User. In certain embodiments, a marketing message may include one or more marketing offers.

Marketing Offer or Offer—includes any offer for sale of any item, good, product or service.

Marketing Program—includes any system that provides marketing messages, marketing content, loyalty programs, coupons, discounts, or any other offers or marketing offers, and/or tracks customer buying habits and other information, including customer information, such as locations, travels, demographics, ordering preferences, etc.

Markup Language—A set of codes in a text file that instructs a computer how to format the file for purposes of printing and/or display, as well as how to index and link the content of the file. Example markup languages include HTML, SGML, XML, VRML, and NRML.

Network Device—includes any device that can be interfaced with a technology network, for example, the Internet, a wireless communications network, (e.g., a cellular telephone system), a LAN, or a WAN.

Optimized—includes determining which marketing offer will likely or generally achieve the desired results or maximum results among or given one or more of several complimentary or competing objectives, including, for example, sales volume, gross margin, profits, customer accept rates, average check, speed of service times, product quality, freshness, customer satisfaction, customer frequency, order point, destination point or any other variables that affect or are of interest to one or more affected parties, e.g., the retail establishment, its suppliers and/or the customer. In certain embodiments, optimized includes finding the maxima or minima of a given function. In certain embodiments, the terms optimized and optimal have corollary meanings.

Output functionality—includes transmission of information via Remote Connectivity and/or conveying Output Materials on a Display and/or tactile feedback.

Output Materials means any one or more of the following, including but is not limited to any one or more of, Marketing Messages, audio, still images and/or video, flash and/or other animated sequences or materials, printed or visual reports or receipts, displayed information, information recorded to or stored on a hard drive or other computer readable medium, a text message, voice mail message, a sound such as a beep or bell or buzzer, audio messages (e.g. a voice prompt or marketing message or other information), including recorded, actual or synthetic voice messages, or any other output generated by a Display, Server, Controller, Network or other device or application that is sent to or processed by a User, Display, Server, Controller, Network or other device for subsequent viewing, listening and/or further processing or storage.

PC—includes a personal computer, such as a laptop, such as one provided by Dell Computers.

PDA—includes a personal digital assistant, such as Palm Pilot, or any other personal computing device, which includes at least one of a display, processor, memory or input or output means.

Point of Sale—includes any Point of Sale system or device that permits an end user to start, enter or complete an order or sales transaction, such as Panasonic's 7900 "all in one", or any other POS devices, terminals or systems, websites, kiosks, PCs, PDAs, Cell Phones, call centers, slot machines, vending machines, and/or any other Internet or other device that provides access to any of the functionality or inventions disclosed herein and or any of the same or similar functionality and/or otherwise permits an end user to practice or benefit from any of the disclosed inventions. Point of Sale and POS shall have corollary meanings.

POS Device, includes a POS or other physical device that provides access to any of the features or inventions disclosed herein and or any of the same or similar functionality and/or otherwise permits an end user to practice or benefit from any of the disclosed inventions.

POS Terminal—includes a POS or other physical device that provides access to any of the foregoing and or any of the same or similar functionality and/or otherwise permits an end user to practice or benefit from any of the disclosed inventions.

Product—includes any machine, manufacture and/or composition of matter, unless expressly specified otherwise.

Prospective Member—includes any person that is not currently a member.

Referral—includes any prospective member identified or otherwise provided by an existing member.

Proximal, Proximity, Proximal/Proximity Data—includes any information about an end user's current or predicted whereabouts. Such information may include distance, i.e., distance between two points, e.g., a retail location and the end user, which distance may be measured directly, e.g., point A to point B, or based upon travel means, e.g., based upon the streets or other paths that a person or end user could actually use to travel from said point A to said point B, and/or may be based upon time, e.g., how long it might take a given end user to travel said distance between point A and point B, perhaps further as determined by such end user's current rate of travel or average rate of travel or method of travel, etc. Methods to calculate distances between two points in space and/or to estimate travel time are well known by those of ordinary skill in the art.

Referral Coupon—includes a marketing message, marketing offer, or other offer, including, for example, a coupon provided to an existing member for providing the identity or other information of a prospective member and/or an action taken by such prospective member, including, for example, such prospective member becoming a member and/or accepting a similar or other marketing offer, e.g., by redeeming a coupon.

Response—includes any action and/or failure to act by any person. For example, a response from a prospective member includes the immediate or subsequent reply to or use of one or more marketing messages or offers or other response, which response includes, but is not limited to, for example, signing up to one or more loyalty, frequency or other marketing programs, acceptance and/or use, e.g., redemption, of any one or more offers or coupon, opting in to one or more loyalty, frequency or other marketing program(s), achieving or maintaining a certain level of sales and/or number or frequency of store visits, purchases of certain products, providing one or more email addresses, visiting one or more retail, restaurant or other store location(s), ordering one or more items, or specific items, or failure to order one or more items or specific items, filling out a form or forms, or providing additional information, such as mailing address, phone number, internet device id information, and/or signing up for one or more third party sponsor programs, and/or any other action as determined or established by the marketing program, pressing one or more buttons and/or clicking on one or more hyperlinks or any combination of the foregoing. The terms response and respond shall have corollary meanings. In some embodiments a referral coupon may be a reward and/or a reward may be a referral coupon. In certain embodiments a referral coupon may be a viral coupon and vice versa.

Reports—in certain of the disclosed embodiments, one or more reports may be developed to provide tracking and/or analysis relating to any one or more data elements associated with any such embodiment or invention. Reports include any feedback or communication requested by or delivered to one or more end users, which may or may not require authorization to receive such report. Reports can be printed, verbalized using a text to speech conversion program, or displayed on any device, including, for example, a POS terminal or other computing device. Such reports may be created and/or delivered using any applicable means available. The methods to create and deliver reports are well understood and known within the industry and are disclosed in the prior art. Reports may be demand request, i.e., a report is generated only when or as requested, or exception based, i.e., a report is generated if a certain condition or conditions are met, not met or change in any defined way. In certain embodiments, reports are generated whenever desired or otherwise indicated or scheduled, and may be stored for subsequent use, which use may or may not be based on a request by an end user. Reports may include any one or more available database elements and/or calculated results based upon any one or more of the databases, database elements, mathematical or statistical manipulations, and/or any of the methods disclosed herein and/or as understood by any person skilled in the art and/or as requested/designed by one or more end users or other authorized personnel. For example, a report may include any one or more pieces of information contained or relating to customer, business or sponsor information, and/or POS transaction data and/or any or all results information generated or associated with any marketing offer or message.

Reward—includes any item or object or incentive that is or might be of benefit to its recipient, for example, a free or discounted item or a financial incentive, presented to an end user, e.g., an existing loyalty or marketing program member. In certain embodiments, rewards may be provided without any action of or by the recipient to receive such reward. In other embodiments, recipients must perform certain actions, e.g., purchase items from a business, or make a commitment to make such purchases, in order to receive, earn or otherwise qualify for any such reward(s). In some embodiments, a reward may be cash or an offer of cash or other financial currency or benefit. In certain embodiments, a reward may be an item, such as a toy, or a coupon. In yet other embodiments, a reward may be a combination of any or all of the foregoing. In certain embodiments, rewards may be created, funded or otherwise provided by businesses or sponsors. Rewards may be offered and/or delivered using any applicable means, including electronic transmission via the Internet, cell phones, text or voice mail, and may include one or more marketing messages or marketing offers. Rewards may be issued, granted or provided by individuals or groups and/or delivered or provided to individuals or groups. In certain embodiments, recipients of one or more rewards may be required to perform a certain task or tasks to qualify and/or to make use of one or more rewards. In some embodiments, rewards may be used only by the specific individual(s) who received the reward. In addition or in the alternate, rewards may be transferable or do not specify the recipient or require that only the recipient may benefit from such reward(s). In some embodiments a coupon may be a reward and/or a reward may be a coupon.

Viral Reward—includes any reward, coupon or other incentive designed to encourage additional use of such reward and/or to encourage one or more additional persons to join a loyalty or marketing program and/or to help achieve any other business, sponsor or customer objective(s). In some embodiments, viral rewards may be communicated via any applicable means, including, for example, via email, voice mail or text based messaging services. The terms viral reward, network reward, viral coupon, and network coupon shall have corollary meanings.

RFID—includes a radio frequency identification tag, transponder or similar devices.

Router—An intermediary device within a communications network that expedites message delivery. Within a single network linking many computers through several possible connections, a router receives transmitted messages and forwards them to their correct destination via an efficient available route.

Sensor—includes any application or device that can make a determination or otherwise detecting the change, presence or absence of something, including, for example, temperature, weight, sound, pressure, volume, mass, light, odors, and/or any recording, or registration, change, presence or absence of or to any data or other electronic media. In certain embodiments a sensor includes one or more transducers.

Sponsor—includes any third party or entity that provides product, goods or services and/or money or other financial means to an end user or retail entity in exchange for the option to communicate with such end user, including, for example, to provide one or more marketing messages or offers, including, e.g., a cross sell offer or sponsor reward.

Store—includes any one or more retail, restaurant or other location, and may include online locations, websites, kiosks, automated stores, e.g., vending machines, so called "brick and mortar" locations, and/or any combination of the foregoing, and/or access to any such location(s) using any POS device.

Sponsor information—includes any information that is provided, known, gathered, assumed or is otherwise determined or stored that is related to or is about or otherwise helps understand, define, operate, improve, track or report the performance of, a sponsor business, for example, customer acquisition and sales data, marketing information, click-through rates, conversion rates, profit and loss information, accounting information, financial information, statistics and ratios, customer information, sponsor information, information about any one or more sponsor objectives, or any other information, business metrics and data and/or business information gathered or stored or otherwise possessed or accessible by a sponsor and/or any of its affiliates, businesses, customers or investors.

Sponsor objective—includes any desired outcome of a sponsor or sponsor business owner, including, for example, acquisition of new customers, conversion of competitor's customers to sponsor's customers, delivery of one or more marketing messages or offers, increases or improvements in sales, profits, customer counts, customer visitation frequency, customer loyalty, average check, average item counts, order contents, speed of service measurements, labor rates, sales per labor hour, year over year or same store sales, percentage market share, annual or periodic growth rates, employee or management retention or turnover rate, inventory control or turns, inventory waste, raw or finished waste, increases in stock prices, improved return on assets or equity, or any other objective as determined by management or other authorized individual or as established by rules or other metrics including or stored in a system designed for such purposes.

Subscription—includes an agreement, which may be implicit or explicit, to purchase a certain quantity of goods, services, products or items and/or purchase the rights to use or access such goods, services, products or items, during or over a specified period of time, and/or an agreement to spend a certain amount of money over a certain period. In certain embodiments, subscriptions may be accepted through an action or failure to act by a subscriber or end user. In certain embodiments, subscriptions may automatically renew based upon an action or inaction of a subscriber or end user. In certain embodiments, a virtual subscription may be accomplished without formal agreement among the affected parties, e.g., by selling a razor that requires use of specific blades.

Tag—A code embedded within a markup language-based electronic file which associates one or more words or images within the document with a Uniform Resource Locator (URL) corresponding to another file. Within the art, a tag of this particular functionality may be referred to as an "HREF" (hypertext reference) tag.

Transaction—includes any communication or agreement between two or more entities, including end users, individuals, retailers, and/or computing systems. In certain embodiments a transaction can include a financial transaction wherein a seller sells and item and a buy buys an item, where such seller may experience an increase in finances while the buyer's finances may decrease. In certain embodiments, a transaction may include a communication between a computing system and any one or more end users, or between two computing systems, a computing system and a database or data repository, two end users, two or more data repositories, etc. In additional embodiments, a transaction includes a POS transaction, where a customer places and pays for one or more items, goods, services, or products and/or access to or use of any or all of the foregoing, and/or via a website and/or using a POS terminal or POS device.

Trial Coupon—includes any offer that encourages the purchase of a new item or an item an end user has not yet tried, which offer may be presented using any applicable means, including use of an electronic or printed coupon.

Upsell—includes any offer to purchase one or more items at a full, discounted or other price including the retail price. Upsells include offers to increase an order size, quantity, type or contents of an entity's, e.g., a customer's order.

Upsell/Instruction/Commission Output device—includes, but is not limited to: a POS terminal, a website, a drive through or other digital menu board, a drive through speaker, a cell phone, telephone, pager or PDA, a kiosk, a vending machine, a customer counter display, an in-store or other digital menu board, a display built into a restaurant table, a vending machine, a speaker, or slot machine.

User—includes any entity or person including a person making use or practicing the various disclosed embodiments of the invention. The terms user and end user shall include corollary meanings.

User-Visible Text Portion—A portion of markup language-based code which specifies the text or other images to be displayed to a Web user. An example (in bold) as well as the corresponding tag (underlined) follows: Ex. <A HREF="http://go.msn.com/npl/msnt.asp"target="_top"><IMGSRC="/chan/home/logo.gif" WIDTH=140 HEIGHT=60 BORDER=0 ALT="Go to msn.com">Microsoft Network</A>

Web Browser—A client application that enables a user to view markup language-based documents on the World Wide Web, another network, or the user's computer; utilize the hyperlinks among the documents, as well as transfer and execute files within the documents.

Web Site—A subset of the World Wide Web comprising a collection of files, documents and graphics made generally available to others through the Internet. In certain embodiments a web site may include means for conducting a transaction, including, for example, a POS transaction.

Wireless Communications Device (WCD)—A communications device that transceives via a non-wired medium, such as radio frequency. A WCD can include, but is not limited to an AM or FM radio device, a television, cell phones, portable phones, and devices, such as laptop computers and PDAs interfaced with a wireless network, for example, a LAN. Applicable formats, standards or protocols, include Ethernet (or IEEE 802.3), SAP, ATP, Bluetooth, and TCP/IP, TDMA, CDMA, and 3G.

World Wide Web—The total set of inter-linked hypertext documents accessible via the Internet.

Computing. It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. A "processor" means one or more microprocessors, central processing units (CPUs), computing devices, microcontrollers, digital signal processors, or like devices or any combination thereof.

A description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software or hardware only.

The term "computer-readable medium" refers to any medium that participates in providing data (e.g., instructions, data structures) which may be read by a computer, a processor or a like device. Such a medium may take many forms, including but not limited to, non-volatile media, volatile media, transitory media, non-transitory media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, or a combination of any of the above). Each of the devices may themselves comprise computers or other computing devices, such as those based on the Intel™, Pentium™ or Centrino™ processor, that are adapted to communicate with the computer. Any number and type of devices may be in communication with the computer.

Remote Connectivity means any method used by a Controller, a Display or a Server or other computing devices to communicate with other devices or networks including, but not limited to the Internet, Satellite networks, Cell Phone networks, other wireless networks and standards such as 802.11, 80211.b, 802.11g, or similar wireless LAN operating standards, or Bluetooth technologies, infrared connections, or any other similar technologies or other technologies such as those described above that permit the sending and/or receiving and/or processing of electronic information in either an encrypted or unencrypted format.

Server means one or more computing systems that include at least one of a processor, computer readable medium, or input/output capabilities and may have local or Remote Connectivity capabilities. Servers may be local or remote to Displays or both. A Server may be or include one or more of a Display and/or a Controller.

In an embodiment, a Server computer or centralized authority may not be necessary or desirable. For example, the present invention may, in an embodiment, be practiced on one or more devices without a central authority. In such an embodiment, any functions described herein as performed by the Server computer or data described as stored on the Server computer may instead be performed by or stored on one or more such devices.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure may refer to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors. The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, TDMA, CDMA, GSM, EDGE, GPRS, WCDMA, AMPS, D-AMPS, IEEE 802.11 (WI-FI), IEEE 802.3, SAP, SAS™ by IGT, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

Figure 3:
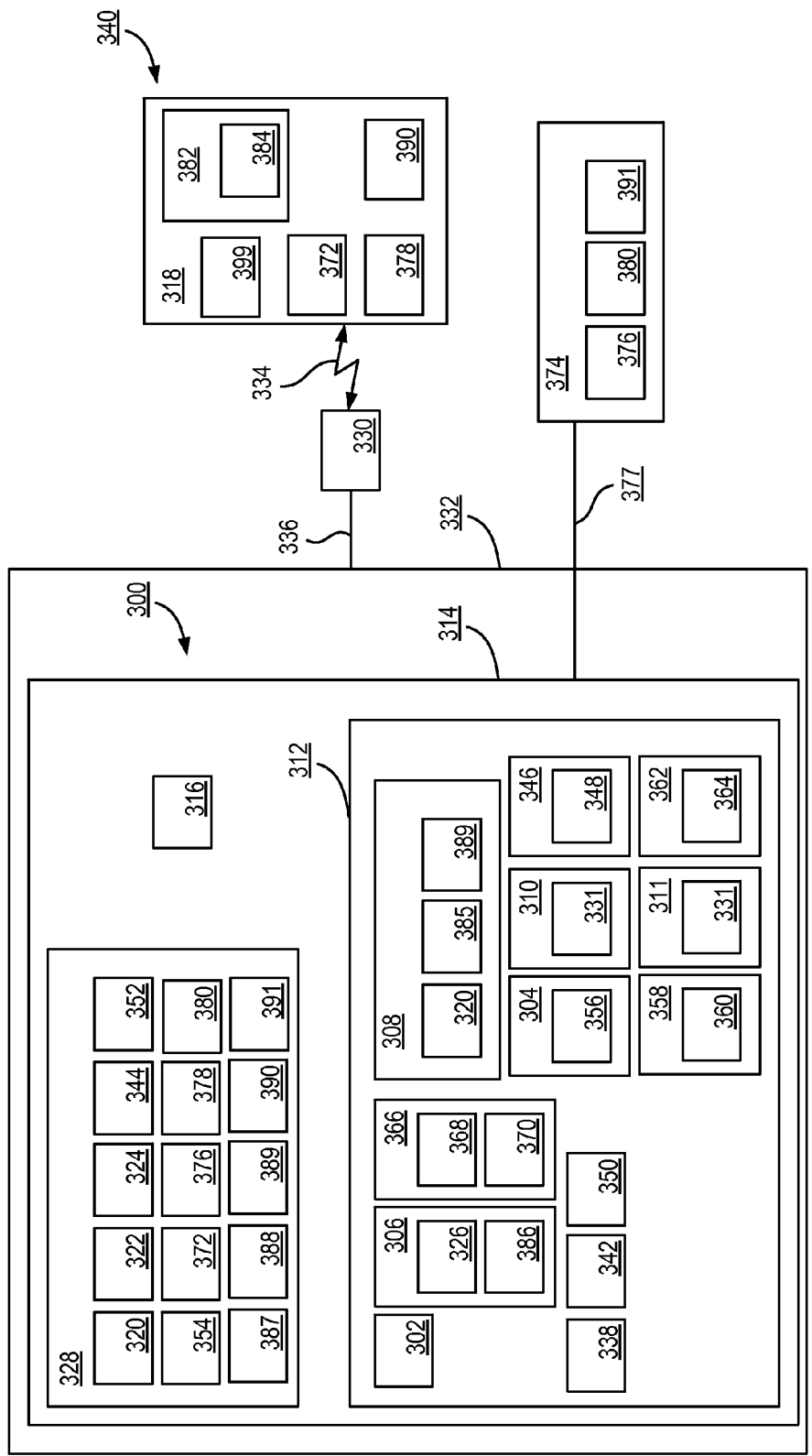
FIG. 3 is a schematic block diagram of a present invention apparatus for generating and transmitting an order initiation offer to a wireless communications device (WCD); and, FIG. 4 is a flow chart of a present invention method for generating and transmitting an order initiation offer to a wireless communications device (WCD).

FIG. 3 is a block diagram for an example system 300 for generating and transmitting an order initiation offer to a wireless communications device (WCD). System 300 includes: identification element 302, eligibility element 304, executable element 306, offer element 308, transceiver element 310, and order initiation element 311, all located in processor 312 of at least one specially programmed general-purpose computer 314. Alternately stated, elements 302, 304, 306, 308, 310, and 311, and any other elements described as being in the processor are functions of the processor or are functions carried out by the processor.

Element 302 identifies, using interface element 316, WCD 318. The eligibility element determines if the WCD is eligible to receive order initiation offer 320. Offer 320 is an offer that is made that when accepted (further described below) initiates a transaction. The executable element is arranged to generate, using one or both of rules 322 and artificial intelligence program 324, at least one executable 326. The set of rules and the artificial intelligence program are stored in memory unit 328. In one embodiment, the executable is generated as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, computer 314 receives at least one modifying rule 372 from a WCD and stores the rule in memory 328. In another embodiment, the WCD is WCD 318. The executable element modifies executable 326 using rule 372. The WCD generates rule 372, and the executable element modifies executable 326 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, computer 374, separate from computer 314, transmits modifying rule 376 to computer 314. Computer 374 can be in location 332 or can be in a different location. Computer 374 can be associated with a business entity associated with location 332 or can be associated with a different business entity. Connection 377 between computers 314 and 374 is any type known in the art. In another embodiment (not shown), multiple computers 374 are included and respective computers among the multiple computers can be associated with the same or different business entities. Computer 314 stores modifying rule 376 in memory 328. Element 306 modifies executable 326 using rule 376. Computer 374 generates rule 376, and element 306 modifies executable 326, respectively, as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

The executable is directed toward determining an offer that is most acceptable to an end user of the WCD and best meets prescribed criteria of the entity making the offer. For example, acceptability could be based on price, free items, or other criteria mentioned below. Rules 322 or program 324 are used to find the appropriate combination of acceptability and entity criteria.

The offer element generates, for an eligible WCD and using the at least one executable, an appropriate order initiation offer 320. In general, the core of offer 320 is shaped by, determined by, or consists of executable 326. The transceiver element transmits, using the interface element, the appropriate order initiation offer 320 to wireless communications network 330 for transmission to the WCD. The transceiver element also is arranged to receive, via the interface element, response 331, including an order, from the WCD. Element 311 initiates fulfillment of the order by any means known in the art.

The interface element can connect with the device, system, or network external to the computer, for example, network 330, using any means known in the art, including, but not limited to a hardwire connection, an optical connection, an Internet connection, or a radio frequency connection. Processor 312 and interface element 316 can be any processor or interface element, respectively, or combination thereof, known in the art.

Computer 314 can be any computer or plurality of computers known in the art. In one embodiment, the computer is located in a retail location with which system 300 is associated, for example, location 332. In another embodiment (not shown), all or parts of the computer are remote from retail locations with which system 300 is associated. In a further embodiment, computer 314 is associated with a plurality of retail locations with which system 300 is associated. Thus, the computer provides the functionality described for more than one retail location. In one embodiment, offer 320 is for an item, good, or service provided by the entity associated with location 332.

A WCD is defined supra. WCD 318 can be any WCD known in the art. In one embodiment, WCD 318 is owned by, leased by, or otherwise already in possession of the end user when system 300 interfaces with the WCD. In the description that follows, it is assumed that the WCD is owned by, leased by, or otherwise already in possession of the end user when system 300 interfaces with the WCD. In general, the WCD communicates with a network, for example, network 330, via radio-frequency connection 334. Network 330 can be any network known in the art. In one embodiment, the network is located outside of the retail location, for example, the network is a commercial cellular telephone network. In one embodiment (not shown), the network is located in a retail location, for example, the network is a local network, such as a Bluetooth network. The interface element can connect with network 330 using any means known in the art, including, but not limited to a hardwire connection, an optical connection, an Internet connection, or a radio frequency connection. In the figures, a non-limiting example of a hardwire connection 336 is shown. In one embodiment, device 318 is connectable to a docking station (not shown) to further enable communication between device 318 and system 300. Any docking station or docking means known in the art can be used. That is, when the device is connected to the docking station, a link is established between the device and system 300.

In a first embodiment, system 300 includes location element 338 in the processor, which determines, using the interface element, location 340 for the WCD. The location of the WCD can be determined using any means known in the art, including, but not limited to, GPS technology and information from network 330. Then, the eligibility element determines eligibility in response to location 340, the executable element generates the at least one executable responsive to location 340, or the offer element generates an appropriate order initiation offer responsive to location 340. It should be understood that any combination of the eligibility, executable, and offer elements can operate responsive to location 340. Any criteria known in the art can be used to control the operation of the eligibility, executable, and offer elements responsive to location 340. For example, the elements can operate when the WCD is within a certain specified distance from one or more retail locations, for example, location 332; the elements can operate to generate offer 320 for a specific retail location according to location 340; or the elements can operate to generate offer 320 offering options with respect to a plurality of retail locations (not shown) based on respective distances of the WCD from the plurality of locations.

In a second embodiment, system 300 includes transaction element 342 that accesses transaction history 344, stored in the memory unit, for the WCD or an end user (not shown) associated with the WCD. In one embodiment, the history is stored in a separate computer system (not shown) accessed by system 300. The eligibility element determines eligibility in response to history 344, the executable element generates the at least one executable responsive to history 344, or the offer element generates an appropriate order initiation offer responsive to history 344. It should be understood that any combination of the eligibility, executable, and offer elements can operate responsive to history 344.

Any criteria known in the art can be used to control the operation of the eligibility, executable, and offer elements responsive to history 344. For example, executable 326 can be generated in response to trends noted in the history. The executable can be directed to a continuation of the trend or can derive variants from the trend that may be acceptable to the end user and in the interest of the retail location. Further, the continuation or variants can be aligned with parameters defined for the retail location. For example, the executable can be addressed to a desired promotion, conditions at the retail location, such as stock on hand, or attempts to increase a total bill for the end user.

In another embodiment, history 344 includes searches made using the WCD or communications by the WCD. Alternately stated, system 300 is linked to search browsers associated with the WCD. Any type of search or WCD communication known in the art can be included in history 344. For example, if the WCD has been used to search for products typically available at a retail location similar to location 332, the offer element generates offers for transmission to the WCD when the WCD is within a specified location of such a retail location, for example, location 332. As another example, the communications can be, but are not limited to, telephone calls or email messages to a specific retail location or to a category of retail locations. As another example, if history 344 shows that the WCD has communicated with location 332, then eligibility or the offer can be tailored in response to this information.

In a third embodiment, the eligibility element determines eligibility in response to a time of day, in general, the time of day when the WCD is identified, the executable element generates the at least one executable responsive to the time of day, or the offer element generates an appropriate order initiation offer responsive to the time of day. It should be understood that any combination of the eligibility, executable, and offer elements can operate responsive to the time of day. Any criteria known in the art can be used to control the operation of the eligibility, executable, and offer elements responsive to the time of day. For example, executable 326 can be generated in response to trends for an end user with respect to the time of day or with parameters for the retail location associated with the time of day. The executable can be directed to a continuation of the trend or can derive variants from the trend that may be acceptable to the end user. Further, the continuation or variants can be aligned with parameters defined for the retail location. For example, the executable can be addressed to a desired promotion, conditions at the retail location, such as stock on hand, or attempts to increase a total bill for the end user.

In a fourth embodiment, the eligibility element determines eligibility in response to the day of the week, the executable element generates the at least one executable responsive to the day of the week, or wherein the offer element generates an appropriate order initiation offer responsive to the day of the week. It should be understood that any combination of the eligibility, executable, and offer elements can operate responsive to the day of the week. Any criteria known in the art can be used to control the operation of the eligibility, executable, and offer elements responsive to the day of the week. For example, executable 326 can be generated in response to trends for an end user with respect to the day of the week or with parameters for the retail location associated with the day. In general, this embodiment operates similar to the embodiment directed to the time of day.

In a fifth embodiment, system 300 includes volume element 346, in the processor, which determines transaction volume 348 for at least one retail location, for example, location 332. Element 346 can use any means known in the art to determine volume 348. In one embodiment, element 346 interfaces with another computer system (not shown) associated with location 332 to determine or obtain volume 348. The eligibility element determines eligibility in response to volume 348, the executable element generates the at least one executable responsive to volume 348, or the offer element generates an appropriate order initiation offer responsive to volume 348. It should be understood that any combination of the eligibility, executable, and offer elements can operate responsive to volume 348. Any criteria known in the art can be used to control the operation of the eligibility, executable, and offer elements responsive to volume 348. For example, executable 326 can be generated to create offers that are higher profit (may be less acceptable to an end user) if the volume is high or can generate lower profit (more acceptable offers) if the volume is low. Also, executable 326 can be refined to address respective volume data for various products or groups of products, rather than overall volume.

In a sixth embodiment, system 300 includes order element 350, in the processor, which determine whether an order (not shown) has been placed previously using the WCD. In one embodiment, element 350 interfaces with another computer system (not shown) associated with location 332 to determine or obtain information regarding a previous order. Then, the eligibility element determines eligibility in response to whether an order has been placed previously using the WCD, the executable element generates the at least one executable responsive to whether an order has been placed previously using the WCD, or the offer element generates an appropriate order initiation offer responsive to whether an order has been placed previously using the WCD. It should be understood that any combination of the eligibility, executable, and offer elements can operate responsive to whether an order has been placed previously using the WCD. Any criteria known in the art can be used to control the operation of the eligibility, executable, and offer elements responsive to whether an order has been placed previously using the WCD. For example, executable 326 can be generated to present more acceptable (perhaps lower profit) offers to first time orders from the WCD or can present more acceptable offers to reward continued use of the WCD to place orders.

In a seventh embodiment, element 350 determines whether an order has been placed previously using the WCD during a specified time of day or a specified day of the week. Then, the eligibility element determines eligibility in response to whether an order has been placed previously using the WCD during a specified time of day or a specified day of the week, the executable element generates the at least one executable responsive to whether an order has been placed previously using the WCD during a specified time of day or a specified day of the week, or the offer element generates an appropriate order initiation offer responsive to whether an order has been placed previously using the WCD during a specified time of day or a specified day of the week. It should be understood that any combination of the eligibility, executable, and offer elements can operate responsive to whether an order has been placed previously using the WCD during a specified time of day or a specified day of the week. Any criteria known in the art can be used to control the operation of the eligibility, executable, and offer elements responsive to whether an order has been placed previously using the WCD during a specified time of day or a specified day of the week. This embodiment is a refinement of the previous embodiment. For example, additional temporal criteria are added to the generation of the executable.

In an eighth embodiment, the eligibility element generates, using at least one of set of rules 352 and artificial intelligence program 354, at least one executable 356. Set of rules 352 and artificial intelligence program 354 are stored in the memory unit. The eligibility element is arranged to determine if the WCD is eligible to receive an order initiation using executable 356. In one embodiment, executable 356 is generated as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, computer 314 receives at least one modifying rule 378 from a WCD and stores the rule in memory 328. In another embodiment, the WCD is WCD 318. Element 304 modifies executable 356 using rule 378. The WCD generates rule 378 and element 304 modifies executable 356 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, computer 374 transmits at least one modifying rule 380 to computer 314. Computer 314 stores modifying rule 380 in memory 328. Element 304 modifies executable 356, using rule 380. Computer 374 generates rule 380, and element 304 modifies executable 356, respectively, as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, the eligibility element determines if an end user associated with the WCD is eligible for the order initiation offer. That is, the criteria with respect to eligibility are with respect to an end user of the WCD. In another embodiment, system 300 includes receiving element 358, in the processor, arranged to receive, using the interface element, transmission 360 from the WCD via the communication network. The identification element identifies the WCD in response to the transmission, using any means known in the art. That is, rather than system 300 contacting the WCD to initiate the operations noted above, system 300 initiates the operations after being contacted by the WCD.

In a further embodiment, system 300 includes inventory element 362, in the processor, which obtains inventory information 364. In general, information 364 related to inventory availability, for example, an inventory of product or services in stock or ready for purchase at the retail location. For example, in a restaurant, information 364 might be regarding the number and type of already-prepared breakfast items at the restaurant. In a location selling durable goods, such as appliances, the information could be regarding whether various of the durable goods are in stock at the retail location. In yet another embodiment, element 362 interfaces with another system, for example, a local or centralized computer system associated with operations at the retail location, to obtain information 364, or to obtain data to determine information 364. In a still further embodiment, element 362 compiles the data necessary to determine information 364. For example, operations at the retail location are processed by computer 314. The eligibility element determines eligibility in response to inventory information, for example, if there is a surplus of items on hand, the requirements for eligibility can be loosened, the executable element generates the at least one executable responsive to inventory information, or the offer element generates an appropriate order initiation offer responsive to inventory information, for example, if the supply of items on hand is low, offers for that item can be made more profitable for the retail location.

In one embodiment, system 300 includes registration element 366, in the processor, which communicates with the WCD through the transceiver element. Element 366 transmits information 368 regarding registration of a WCD with system 300, for example, soliciting registration, providing instructions for registering, and promoting registration. Element 366 also receives registration information 370 for the WCD.

In one embodiment, memory element 382 in WCD 318 stores at least one rule 384. Processor 399 in the WCD implements offer 320 according to rule 384. The WCD generates rule 384, and operates on offer 320 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment the offer element determines redemption rate 385 for offer 326. The executable element generates at least one executable 386, using the redemption rate, and at least one of set of rules 387 or artificial intelligence program 388 stored in memory unit 328. The offer element generates appropriate order initiation offer 389 using executable 386, and the transmission element transmits, using the interface element, offer 389 to the wireless communications network for transmission to the WCD.

In another embodiment, the offer element modifies, using the redemption rate, rules 322 or artificial intelligence program 324 to create rules 387 or artificial intelligence program 388, respectively.

In a further embodiment, offers 320 and 389 are transmitted to the WCD regardless of the location of the WCD with respect to a business location, for example, location 332, and stored in memory 382. The location element determines, using the interface element, when the WCD is within a specified distance (not shown) of the business location and retrieves, using the interface element, offer 320 or 389 from memory 382 for presentation, for example, on a point of sale station for the business location. In another embodiment, offers 320 and 389 are stored in memory 328 until the location element, using the interface element, identifies the WCD as being within a specified distance (not shown) of the business location, at which time offers 320 and 389 are transmitted to the WCD.

In one embodiment, computer 314 receives at least one modifying rule 390 from a WCD and stores the rule in memory 328. In another embodiment, the WCD is WCD 318. Element 306 modifies executable 386 using rule 390. The WCD generates rule 390 and element 306 modifies executable 186 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, computer 374 transmits at least one modifying rule 391 to computer 314. Computer 314 stores modifying rule 391 in memory 328. Element 306 modifies executable 386, using rule 391. Computer 374 generates rule 391, and element 306 modifies executable 386, respectively, as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

It should be understood that various storage and removal operations, not explicitly described above, involving memory 328 and as known in the art, are possible with respect to the operation of system 300. For example, outputs from and inputs to the general-purpose computer can be stored and retrieved from the memory elements and data generated by the processor can be stored in and retrieved from the memory.

It should be understood that the locating element can determine the distance of the WCD from more than one business, or retail, location. It also should be understood that the offer element can generate and transmit more than one offer for a business location and can generate respective offers for more than one business location or entity. It also should be understood that a plurality of distance and offer criteria and metrics can be used by the location and offer elements to determine a distance to use and to generate an offer, respectively. The criteria and metrics can include, but are not limited to, information specific to operations at a particular business entity or business location, geographical information, and temporal aspects, such as time of day.

It should be understood that system 300 can be operated by the same business entity operating or owning a business location using the system, or can be operated by a third party different than the business entity operating or owning the business location using the system. In one embodiment, a third party operates system 300 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 13, 2007.

It should be understood that system 300 can be integral with a computer operating system for a business location, for example, location 332 or with a business entity operating the business location. It also should be understood that system 300 can be wholly or partly separate from the computer operating system for a retail location, for example, location 332, or with a business entity operating the business location.

It should be understood that although individual rule sets and artificial intelligence programs are discussed, the individual rule sets and AI programs can be combined into composite rules sets or artificial intelligence programs. Any combination of individual rule sets or artificial intelligence programs is included in the spirit and scope of the claimed invention. For example, rules 322 and 352 can be a single set of rules (not shown) or artificial intelligence programs 324 and 354 can be a single program (not shown).

It should be understood that the examples above regarding executables are non-limiting, are meant to provide only a broad overview, and do not address the number, complexity, structure, or interrelationships of the operations included in the actual generation of the executables.

Figure 4:
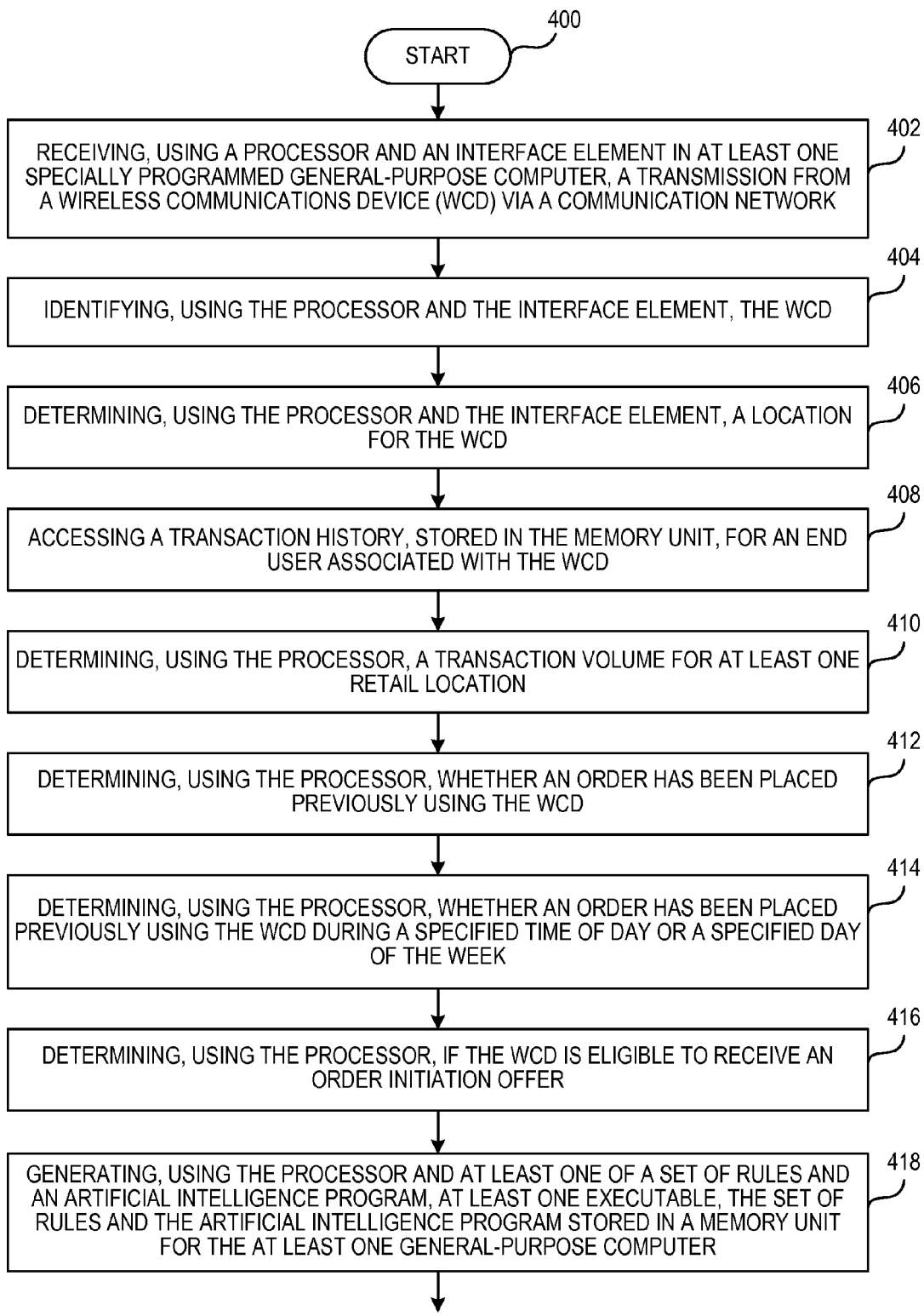
Figure 4:
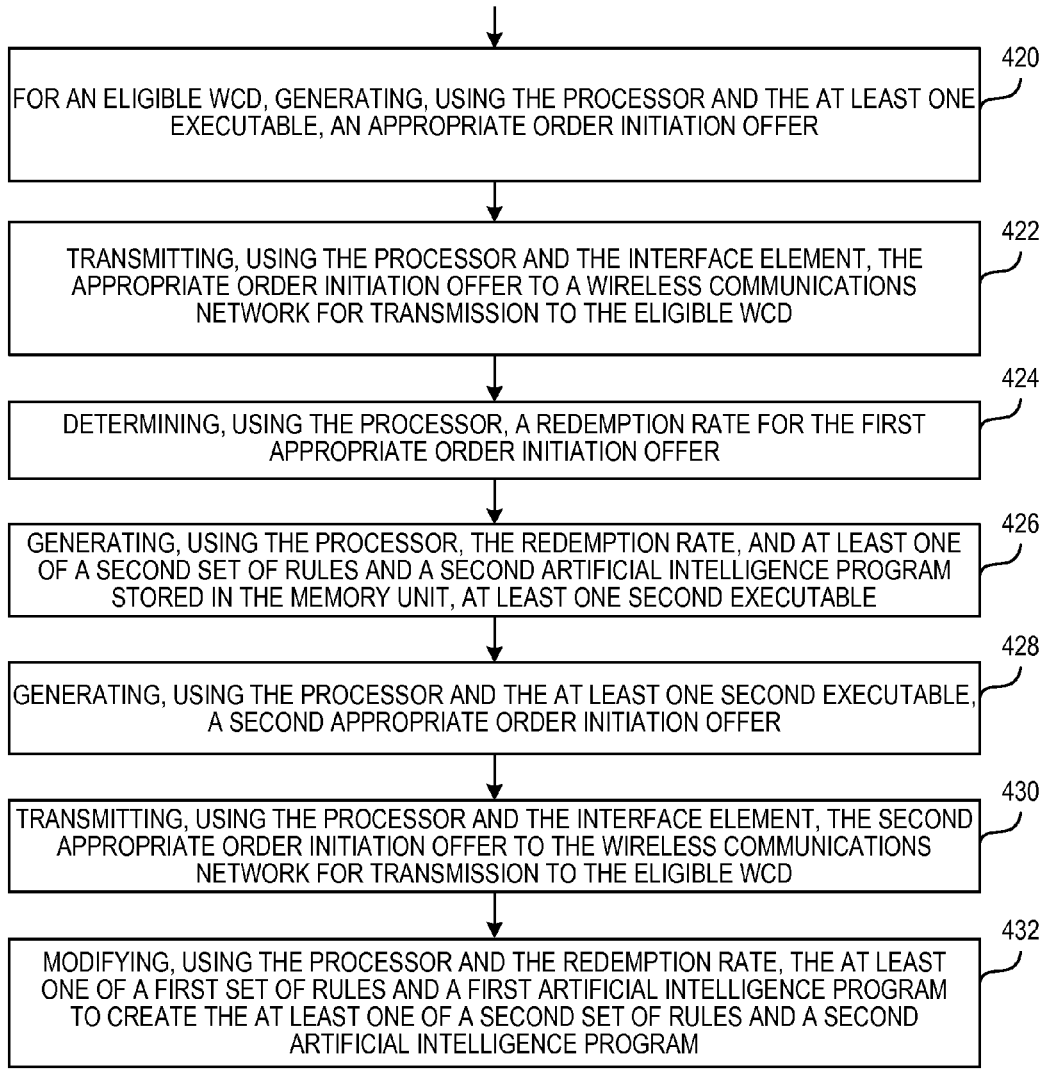

FIG. 4 is a flow chart illustrating a present invention computer-based method for generating and transmitting an order initiation offer to a wireless communications device (WCD). Although the method in FIG. 4 is depicted as a sequence of numbered steps for clarity, no order should be inferred from the numbering unless explicitly stated. The method starts at Step 400. Step 404 identifies, using a processor and an interface element in at least one specially programmed general-purpose computer, a WCD. Step 416 determines, using the processor, if the WCD is eligible to receive an order initiation offer. Step 418 generates, using the processor and at least one of a set of rules or an artificial intelligence program, at least one executable, the set of rules and the artificial intelligence program stored in a memory unit for the at least one general-purpose computer. Step 420, for an eligible WCD, generates, using the processor and the at least one executable, an appropriate order initiation offer. Step 422 transmits, using the processor and the interface element, the appropriate order initiation offer to a wireless communications network for transmission to the eligible WCD.

In a first embodiment, step 406 determines, using the processor and the interface element, a location for the WCD and determining if the WCD is eligible to receive an order initiation offer includes determining in response to the location, generating at least one executable includes generating the at least one executable responsive to the location, or generating an appropriate order initiation offer includes generating the appropriate order initiation offer responsive to the location.

In a second embodiment, step 408 accesses a transaction history, stored in the memory unit, for an end user associated with the WCD and determining if the WCD is eligible to receive an order initiation offer includes determining in response to the transaction history, and generating at least one executable includes generating the at least one executable responsive to the transaction history, or generating an appropriate order initiation offer includes generating the appropriate order initiation offer responsive to the transaction history. In one embodiment, the history includes searches made using the WCD or communications by the WCD. Alternately stated, the method links to search browsers associated with the WCD. Any type of search or WCD communication known in the art can be included in the history. For example, if the WCD has been used to search for products typically available at a retail location similar to the retail location, step 420 generates offers for transmission to the WCD when the WCD is within a specified location of such a retail location. As another example, the communications can be, but are not limited to, telephone calls or email messages to a specific retail location or to a category of retail locations. As another example, if the history shows that the WCD has communicated with the retail location, then steps 416 or 420 can be tailored in response to this information.

In a third embodiment, step 410 determines, using the processor, a transaction volume for at least one retail location and determining if the WCD is eligible to receive an order initiation offer includes determining in response to the transaction volume, and generating at least one executable includes generating the at least one executable responsive to the transaction volume, or generating an appropriate order initiation offer includes generating the appropriate order initiation offer responsive to the transaction volume.

In a fourth embodiment, step 412 determines, using the processor, whether an order has been placed previously using the WCD and determining if the WCD is eligible to receive an order initiation offer includes determining in response to whether an order has been placed previously using the WCD, and generating at least one executable includes generating the at least one executable responsive to whether an order has been placed previously using the WCD, or generating an appropriate order initiation offer includes generating the appropriate order initiation offer responsive to whether an order has been placed previously using the WCD.

In a fifth embodiment, step 414 determines, using the processor, whether an order has been placed previously using the WCD during a specified time of day or a specified day of the week and determining if the WCD is eligible to receive an order initiation offer includes determining in response to whether an order has been placed previously using the WCD during the specified time of day or the specified day of the week, and generating at least one executable includes generating the at least one executable responsive to whether an order has been placed previously using the WCD during the specified time of day or the specified day of the week, or generating an appropriate order initiation offer includes generating the appropriate order initiation offer responsive to whether an order has been placed previously using the WCD during the specified time of day or the specified day of the week.

In a sixth embodiment, step 416 obtains, using the processor, inventory information and determining if the WCD is eligible to receive an order initiation offer includes determining in response to the inventory information, and generating at least one executable includes generating the at least one executable responsive to the inventory information, or generating an appropriate order initiation offer includes generating the appropriate order initiation offer responsive to the inventory information.

In a seventh embodiment, step 424 determines, using the processor, a redemption rate for the first appropriate order initiation offer; step 426 generates, using the processor, the redemption rate, and at least one of a second set of rules and a second artificial intelligence program stored in the memory unit, at least one second executable; step 428 generates, using the processor and the at least one second executable, a second appropriate order initiation offer; and step 430 transmits, using the processor and the interface element, the second appropriate order initiation offer to the wireless communications network for transmission to the eligible WCD. In an eighth embodiment, step 432 modifies, using the processor and the redemption rate, the at least one of a first set of rules and a first artificial intelligence program to create the at least one of a second set of rules and a second artificial intelligence program.

In a ninth embodiment, determining, using the processor, if the WCD is eligible to receive an order initiation offer includes using at least one of the set of rules or the artificial intelligence program. In a tenth embodiment, determining if the WCD is eligible to receive an order initiation offer includes determining if an end user associated with the WCD is eligible for the order initiation offer. In an eleventh embodiment, determining if the WCD is eligible to receive an order initiation offer includes determining eligibility in response to the time of day, generating at least one executable includes generating the at least one executable responsive to the time of day, or generating an appropriate order initiation offer includes generating the appropriate order initiation offer responsive to the time of day. In a twelfth embodiment, determining if the WCD is eligible to receive an order initiation offer includes determining in response to a day of the week, generating at least one executable includes generating the at least one executable responsive to the day of the week, or generating an appropriate order initiation offer includes generating the appropriate order initiation offer responsive to the day of the week.

In a thirteenth embodiment, step 402 receives, using the processor and the interface element, a transmission from the WCD via the communication network and identifying a WCD includes identifying the WCD in response to the transmission.

The following is a non-limiting example of a sequence associated with a present invention system or method:
Create Offer Rules and Conditions:
    Retrieve Rule and Condition Parameters
    Retrieve Redemption Rate of Offers with corresponding rules and conditions
    Generate offers based on Parameters and Redemption rate
    Store new offers
Create Offers:
    Retrieve Offer Parameters
    Retrieve Redemption Rate of Offers
    Generate offers based on Parameters and Redemption rate
    Store new offers
Receive Offer Redemptions:
    Receive an indication that an offer is being redeemed
    Store offer redemption
Generate Offers Based on Rules and Conditions:
    Receive and end user device id
    Retrieve available offers
    Apply rules and conditions to offers
    Output appropriate offers to end user device based on rules and conditions
Generate Time/Traffic Map:
    Measure traffic per time period
    Generate and store map of time/traffic
Modify Offer Rules and Conditions Based on Redemption:
    Retrieve redemption information
    Apply redemption criteria to offer rules and conditions
    Modify rules and conditions and/or create new rules and conditions based on redemption information
Modify Offers Based on Redemption:
    Retrieve redemption information
    Apply redemption criteria to offers
    Modify offers and/or create new offers based on redemption information
Create Pool of Offers and Select Appropriate Offers from Pool:
    Receive end user device
    Retrieve available offers
    Generate pool of appropriate offers based on rules and conditions
    Select offers from pool bases on selection rules and conditions
    Output appropriate offers to end user device The following is a listing of exemplary systems and methods in accordance with various embodiments described in this disclosure:

A-1. A method for generating and transmitting an order initiation offer to a wireless communications device (WCD), comprising the steps of: identifying, using a processor and an interface element in at least one specially programmed general-purpose computer, a WCD; determining, using the processor, if the WCD is eligible to receive an order initiation offer; generating, using the processor and at least one of a first set of rules and a first artificial intelligence program, at least one first executable, the first set of rules and the first artificial intelligence program stored in a memory unit for the at least one general-purpose computer; for an eligible WCD, generating, using the processor and the at least one first executable, a first appropriate order initiation offer; and, transmitting, using the processor and the interface element, the first appropriate order initiation offer to a wireless communications network for transmission to the eligible WCD.

A-2. The method of A-1 further including the step of determining, using the processor and the interface element, a location for the WCD, wherein determining if the WCD is eligible to receive an order initiation offer includes determining eligibility in response to the location, and wherein generating at least one executable includes generating the at least one executable responsive to the location, or wherein generating a first appropriate order initiation offer includes generating the first appropriate order initiation offer responsive to the location.

A-3. The method of A-1 further including the step of accessing a transaction history, stored in the memory unit, for an end user associated with the WCD, wherein determining if the WCD is eligible to receive an order initiation offer includes determining eligibility in response to the transaction history, and wherein generating at least one executable includes generating the at least one executable responsive to the transaction history, or wherein generating a first appropriate order initiation offer includes generating the first appropriate order initiation offer responsive to the transaction history.

A-4. The method of A-1 wherein determining if the WCD is eligible to receive an order initiation offer includes determining eligibility in response to a first time of day, and wherein generating at least one executable includes generating the at least one executable responsive to a second time of day, or wherein generating a first appropriate order initiation offer includes generating the first appropriate order initiation offer responsive to a third time of day.

A-5. The method of A-1 wherein determining if the WCD is eligible to receive an order initiation offer includes determining eligibility in response to a first day of the week, and wherein generating at least one executable includes generating the at least one executable responsive to a second day of the week, or wherein generating a first appropriate order initiation offer includes generating the first appropriate order initiation offer responsive to a third day of the week.

A-6. The method of A-1 further including the step of obtaining, using the processor, inventory information, wherein determining if the WCD is eligible to receive an order initiation offer includes determining eligibility in response to the inventory information, and wherein generating at least one executable includes generating the at least one executable responsive to the inventory information, or wherein generating a first appropriate order initiation offer includes generating the first appropriate order initiation offer responsive to the inventory information.

A-7. The method of A-1 further including the step of determining, using the processor, a transaction volume for at least one retail location, wherein determining if the WCD is eligible to receive an order initiation offer includes determining eligibility in response to the transaction volume, and wherein generating at least one executable includes generating the at least one executable responsive to the transaction volume, or wherein generating a first appropriate order initiation offer includes generating the first appropriate order initiation offer responsive to the transaction volume.

A-8. The method of A-1 further including the step of determining, using the processor, whether an order has been placed previously using the WCD, wherein determining if the WCD is eligible to receive an order initiation offer includes determining eligibility in response to whether an order has been placed previously using the WCD, and wherein generating at least one executable includes generating the at least one executable responsive to whether an order has been placed previously using the WCD, or wherein generating a first appropriate order initiation offer includes generating the first appropriate order initiation offer responsive to whether an order has been placed previously using the WCD.

A-9. The method of A-1 further including the step of determining, using the processor, whether an order has been placed previously using the WCD during a specified time of day or a specified day of the week, wherein determining if the WCD is eligible to receive an order initiation offer includes determining eligibility in response to whether an order has been placed previously using the WCD during the specified time of day or the specified day of the week, and wherein generating at least one executable includes generating the at least one executable responsive to whether an order has been placed previously using the WCD during the specified time of day or the specified day of the week, or wherein generating a first appropriate order initiation offer includes generating the first appropriate order initiation offer responsive to whether an order has been placed previously using the WCD during the specified time of day or the specified day of the week.

A-10. The method of A-1 further including the step of generating, using the processor and at least one of a second set of rules and a second artificial intelligence program, at least one second executable, the second set of rules and the second artificial intelligence program stored in the memory unit and wherein determining, using the processor, if the WCD is eligible to receive an order initiation offer includes using the at least one second executable to determine eligibility.

A-11. The method of A-1 wherein determining if the WCD is eligible to receive an order initiation offer includes determining if an end user associated with the WCD is eligible for the order initiation offer.

A-12. The method of A-1 further including the step of receiving, using the processor and the interface element, a transmission from the WCD via the communication network and wherein identifying a WCD includes identifying the WCD in response to the transmission.

A-13. The method of A-1 further including the steps of: determining, using the processor, a redemption rate for the first appropriate order initiation offer; generating, using the processor, the redemption rate, and at least one of a second set of rules and a second artificial intelligence program stored in the memory unit, at least one second executable; generating, using the processor and the at least one second executable, a second appropriate order initiation offer; and, transmitting, using the processor and the interface element, the second appropriate order initiation offer to the wireless communications network for transmission to the eligible WCD.

A-14. The method of A-13 further comprising the step of modifying, using the processor and the redemption rate, the at least one of a first set of rules and a first artificial intelligence program to create the at least one of a second set of rules and a second artificial intelligence program.

A-15. A system for generating and transmitting an order initiation offer to a wireless communications device (WCD), comprising: an identification element, in a processor of at least one specially programmed general-purpose computer, arranged to identify, using an interface element in the general-purpose computer, a WCD; an eligibility element, in the processor, arranged to determine if the WCD is eligible to receive a first order initiation offer; an executable element, in the processor, arrange to generate, using at least one of a first set of rules and a first artificial intelligence program, at least one executable, the first set of rules and the first artificial intelligence program stored in a memory unit for the at least one general-purpose computer; an offer element, in the processor, arranged to generate, for an eligible WCD and using the at least one executable, a first appropriate order initiation offer; and, a transmission element, in the processor, arranged to transmit, using the interface element, the first appropriate order initiation offer to a wireless communications network for transmission to the WCD.

A-16. The system of A-15 further including a location element, in the processor arranged to determine, using the interface element, a location for the WCD, wherein the eligibility element is arranged to determine eligibility in response to the location, and wherein the executable element is arranged to generate the at least one executable responsive to the location, or wherein the offer element is arranged to generate the first appropriate order initiation offer responsive to the location.

A17. The system of A-15 further including a transaction element arranged to access a transaction history, stored in the memory unit, for an end user associated with the WCD, wherein the eligibility element is arranged to determine eligibility in response to the history, and wherein the executable element is arranged to generate the at least one executable responsive to the history, or wherein the offer element is arranged to generate the first appropriate order initiation offer responsive to the history.

A-18. The system of A-15 further including an inventory element, in the processor, arranged to obtain inventory information, wherein the eligibility element is arranged to determine eligibility in response to inventory information, and wherein the executable element is arranged to generate the at least one executable responsive to inventory information, or wherein the offer element is arranged to generate the first appropriate order initiation offer responsive to inventory information.

A-19. The system of A-15 wherein the eligibility element is arranged to determine eligibility in response to a time of day, and wherein the executable element is arranged to generate the at least one executable responsive to the time of day, or wherein the offer element is arranged to generate the first appropriate order initiation offer responsive to the time of day.

A-20. The system of A-15 wherein the eligibility element is arranged to determine eligibility in response to a day of the week, and wherein the executable element is arranged to generate the at least one executable responsive to the day of the week, or wherein the offer element is arranged to generate the first appropriate order initiation offer responsive to the day of the week.

A-21. The system of A-15 further including a volume element, in the processor, arranged to determine a transaction volume for at least one retail location, wherein the eligibility element is arranged to determine eligibility in response to the volume, and wherein the executable element is arranged to generate the at least one executable responsive to the volume, or wherein the offer element is arranged to generate the a first appropriate order initiation offer responsive to the volume.

A-22. The system of A-15 further including an order element, in the processor, arranged to determine whether an order has been placed previously using the WCD, wherein the eligibility element is arranged to determine eligibility in response to whether an order has been placed previously using the WCD, and wherein the executable element is arranged to generate the at least one executable responsive to whether an order has been placed previously using the WCD, or wherein the offer element is arranged to generate the first appropriate order initiation offer responsive to whether an order has been placed previously using the WCD.

A-23. The system of A-22 wherein the order element is arranged to determine whether an order has been placed previously using the WCD during a specified time of day or a specified day of the week, wherein the eligibility element is arranged to determine eligibility in response to whether an order has been placed previously using the WCD during a specified time of day or a specified day of the week, and wherein the executable element is arranged to generate the at least one executable responsive to whether an order has been placed previously using the WCD during a specified time of day or a specified day of the week, or wherein the offer element is arranged to generate the first appropriate order initiation offer responsive to whether an order has been placed previously using the WCD during a specified time of day or a specified day of the week.

A-24. The system of A-15 wherein the eligibility element is arranged to generate, using at least one of a second set of rules and a second artificial intelligence program, at least one second executable, the second set of rules and the second artificial intelligence program stored in the memory unit and wherein the eligibility element is arranged to determine if the WCD is eligible to receive an order initiation using the at least one second executable.

A-25. The system of A-15 wherein the eligibility element is arranged to determine if an end user associated with the WCD is eligible for the order initiation offer.

A-26. The system of A-15 further comprising a receiving element, in the processor, arranged to receive, using the interface element, a transmission from the WCD via the communication network and wherein the identification element is arranged to identify the WCD in response to the transmission.

A-27. The system of A-15 wherein the offer element is arranged to determine a redemption rate for the first appropriate order initiation offer, wherein the executable element is arranged to generate, using the redemption rate, and at least one of a second set of rules and a second artificial intelligence program stored in the memory unit, at least one second executable, wherein the offer element is arranged to generate, using the at least one second executable, a second appropriate order initiation offer, and wherein the transmission element is arranged to transmit the second appropriate order initiation offer to the wireless communications network for transmission to the WCD.

A-28. The system of A-27 wherein the offer element is arranged to modify, using the redemption rate, the at least one of a first set of rules and a first artificial intelligence program to create the at least one of a second set of rules and a second artificial intelligence program.

The following is a listing of exemplary hardware and software that may be used in a present invention method or system. It should be understood that a present invention method or system is not limited to any or all of the hardware or software shown, that not all of the exemplary hardware and/or software may be necessary or desirable for particular embodiments, and that other hardware and software are included in the spirit and scope of the claimed invention.

1. Hardware:
   a. Central System, Central Controller or Local Controllers. The present invention can be managed by a central system on behalf of multiple business entities or locations or systems associated with portions of the multiple business entities or locations can implement the present invention.
   b. Retailer System/Device 1-*n*: may be used, in accordance with some embodiments, for tracking the acceptance of order initiation offers and/or the transactions processed when offers are accepted.
   c. End User Device 1-*n*: may be used, in accordance with some embodiments, for receiving order initiation offers.
2. Software:
   a. Desired Transaction Program: generates desired transactions; modifies desired transactions, for example, based on performance metrics; generates and modifies presentations for desired transactions; and manages desired transactions.

b. Incentive Program: generates incentives; modifies incentives, for example, based on performance metrics; generates and modifies presentations for incentives; and manages incentives.

c. Reward Program: manages available and active programs regarding generation, allocation, and dissemination of rewards.

d. Reward Alteration Program: alters reward programs based on performance data.

e. Offer Initiation Program: creates offers and outputs them to appropriate parties based on rules and conditions.

f. Offer Rules and Condition Creation Program: creates rules and conditions under which offers can be made.

g. Time/Traffic Map Generation Program: creates time/traffic maps of stores that can be used to help generate specific offers during specific traffic times.

The following is a listing of exemplary data bases that can be used in a present invention method or system. It should be understood that a present invention method or system is not limited to any or all of the databases shown, that not all of the exemplary hardware and/or software may be necessary or desirable for particular embodiments, and that other databases are included in the spirit and scope of the claimed invention.

Account Database-stores master account information.
Sub-account Database-stores sub account information.
Transaction Database-stores transaction data including reward program data and transaction histories, for example, history 110.
Rewards Database-stores available rewards programs.
Rewards Rules Database-stores rules for rewards programs.
Reward Incentive Database-stores incentives for rewards programs.
Reward Incentive Rules Database-stores rules for making rewards program incentives.
Active Reward Programs Database-stores active rewards programs.
Account and Sub-account Score/Class Database-stores scoring data for accounts and sub accounts.
Available Penalty Database-stores penalties that can be associated with reward programs.
Available Obligation Database-stores obligations that can be associated with rewards programs.
Available Alerts Database-stores alerts that can be associated with reward programs.
Alerts Database-stores active alerts.
Alerts Rules Database-stores rules for making alerts.
End User Database: Stores Relevant Information about WCDs
End User ID
End user profile: a score of the customer based on their purchase behavior that can be used to qualify and end user for an offer
End user device 1-$n$: the WCDs associated with the end user
End user transaction history
End user Offer history: offers that the end user has gotten in the past and whether or not they were accepted
Order Initiation Offer Database: Available Order Initiation Offers
Offer ID
Offer descriptor
Order Initiation Offer Rules Database: Rules Used to Determine if an Offer should be Made to a WCD
Offer rules ID
Offer rules descriptor
Applicable Offer ID 1-$n$
Qualification Metrics Database: Stores Metrics Used to Qualify WCDs and Order Initiation Offers
Metric ID
Descriptor
Rules and Conditions
Customer ID
Customer Transaction History
Personal Information
Email Address
Offers made 1-$n$
Referrer ID
Referral ID
Status
Customer Type
Inventory Database
Item ID
Descriptor
Quantity
Price 1-$n$
Offers 1-$n$
Transaction Database
Transaction ID
Items 1-$n$
Offer ID 1-$n$
Offer Accepted
Accepted Offer Type
Offer Database
Offer ID
Item ID 1-$n$
Offer Rules 1-$n$
Customer ID 1-$n$
Retailer ID
Price (how much retailer pays if offer is made and/or redeemed)
Time criteria 1-$n$
Date Criteria 1-$n$
Customer Criteria 1-$n$
Offer payment price (what retailer will pay for offer to be made or redeemed)
Traffic Criteria
Geographic Range (how far device is from retailer on average or in real time)
Offer Rules Database
Offer Rule ID
Offer Conditions 1-$n$
Customer ID 1-$n$
Customer Type 1-$n$
Offers 1-$n$
Retailer 1-$n$
Retailer Type
Retailer Database
Retailer ID
Type
Offers 1-$n$
Rules 1-$n$
Conditions 1-$n$
Rule Parameters 1-$n$ (i.e. exclusion sets)
Condition Parameters 1-$n$
Offer Parameters 1-$n$ (parameters used for System for Generating, Selecting, and Running Executables in a Business System Utilizing a Combination of User Defined Rules and Artificial Intelligence)

Offer Selection Rules and Conditions
Offer Selection Rule ID
Descriptor
Offers 1-*n*
Offer rules and conditions 1-*n*
End user device types
End user 1-*n*

It is to be understood that the embodiments and variations shown and described herein are merely illustrative of the principles of this invention and that various modifications may be implemented by those skilled in the art without departing from the scope and the spirit of the invention. For example, while the invention has been illustrated as being implemented using particular computer systems including hardware components such as a computer, POS terminals, portable employee terminals, and input and output devices, the invention could also be implemented using other hardware components and/or other interconnections between such components. Also, while the invention has been described as being implemented using a computer, some or all of the functionality could alternatively reside in a POS terminal or other computing device (e.g., a headset). The invention could also be implemented using discrete hardwired components instead of computers. Further, while the above description refers to particular databases, other databases or data structures could be used. In addition, while various embodiments of methods in accordance with the invention have been discussed which include specific steps listed in specific orders, a person of skill in the art will recognize that these steps can be performed in different combinations and orders. While other modifications will be evident to those skilled in the art, the present invention is intended to extend to those modifications that nevertheless fall within the scope of the appended claims.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A non-transitory computer-readable memory storing instructions configured so that when executed by a processor the instructions direct the processor to perform a method, the method comprising:
   storing, in a memory element for at least one specially-programmed general purpose computer:
      a transaction history for the account with respect to a business entity, and
      an incentive regarding the business entity previously offered to the account,
      wherein the transaction history includes at least one of:
         a transaction involving the business entity and the account, or
         a transaction involving the business entity and a sub-account of the account;
   determining, using a processor in the at least one specially-programmed general purpose computer, a metric;
   generating, using the processor and based on the transaction history and the metric, a desired transaction involving a holder of the account and the business entity;
   generating an incentive, using the processor, based on an artificial intelligence program (AIP), the transaction history, and the metric; and
   transmitting, using an interface element for the at least one specially-programmed general purpose computer, the desired transaction and the incentive for presentation to the holder of the account.

2. The non-transitory computer-readable memory of claim 1 wherein the instructions are further configured to direct the processor to perform:
   storing the metric in the computer-readable memory.

3. The non-transitory computer-readable memory of claim 1 wherein the instructions are further configured to direct the processor to perform:
   storing data regarding the account in the computer-readable memory, the data being different than the transaction history; and
   generating the metric based on the data and the AIP.

4. The non-transitory computer-readable memory of claim 1 wherein generating the desired transaction comprises comparing the transaction history with the metric.

5. The non-transitory computer-readable memory of claim 1 wherein the instructions are further configured to direct the processor to perform:
   generating the incentive using the AIP.

6. The non-transitory computer-readable memory of claim 1 wherein the instructions are further configured to direct the processor to perform:
   receiving, via the interface element, data regarding a transaction between the business entity and the account, transacted following transmission of the desired transaction and the modified incentive; and
   comparing the data with respect to the desired transaction; and,
   for compliance of the transaction with the desired transaction, authorizing reward of the modified incentive; or,
   for non-compliance of the transaction with the desired transaction, further modifying, using the AIP, the incentive according to the comparison of the transaction and the desired transaction.

7. The non-transitory computer-readable memory of claim 1 wherein the instructions are further configured to direct the processor to perform:
   generating, using the AIP, at least one rule; and,
   storing the at least one rule in the memory element, wherein generating the incentive includes using the at least one rule.

8. The non-transitory computer-readable memory of claim 1 wherein the instructions are further configured to direct the processor to perform:
   storing at least one rule in the memory element; and,
   modifying, using the processor and the AIP, the at least one rule based on the transaction history and the metric, and wherein generating the desired transaction includes using the at least one modified rule, or wherein generating the incentive includes using the at least one modified rule.

9. The non-transitory computer-readable memory of claim 1 wherein the instructions are further configured to direct the processor to perform:
   generating a conversion metric, using the AIP, based on the transaction history;
   receiving, using the interface element, a request to transfer a reward within the account;
   modifying the reward based on the conversion metric; and,
   transferring, using the processor, the modified reward within the account.

10. The non-transitory computer-readable memory of claim 1 wherein the instructions are further configured to direct the processor to perform:

receiving, using the interface element, at least one rule from a wireless communications device (WCD); and storing the at least one rule in the computer-readable memory, and wherein at least one of modifying the incentive, generating the desired transaction and transmitting the desired transaction is performed using the at least one rule.

11. The non-transitory computer-readable memory of claim 1 wherein transmitting the desired transaction and the incentive comprises:

transmitting the desired transaction and the incentive to a wireless communications device (WCD).

12. The non-transitory computer-readable memory of claim 1, further comprising:

identifying, using the processor, a wireless communications device (WCD);

determining, using the processor, that the WCD is eligible to receive an order initiation offer; and wherein transmitting the desired transaction and the incentive comprises:

transmitting, using the processor, the desired transaction and the incentive to the eligible WCD.

13. The non-transitory computer-readable memory of claim 1, further comprising:

generating, using the processor and at least one of a first set of rules and the AIP, a first executable.

14. The non-transitory computer-readable memory of claim 13, wherein generating the incentive comprises:

generating, using the processor and the first executable, a first appropriate order initiation offer.

15. The non-transitory computer-readable memory of claim 13, wherein generating the desired transaction comprises:

generating, using the processor and the first executable, a first appropriate order initiation offer.

16. A non-transitory computer-readable memory storing instructions configured so that when executed by a processor the instructions direct the processor to perform a method, the method comprising:

storing, in a memory element for at least one specially-programmed general purpose computer:

a transaction history for the account with respect to a business entity, and an incentive regarding the business entity previously offered to the account;

determining, using a processor in the at least one specially-programmed general purpose computer, a metric;

identifying, using the processor, a wireless communications device (WCD);

determining, using the processor, that the WCD is eligible to receive an order initiation offer;

generating, using the processor an artificial intelligence program (AIP), at least one executable;

generating, using the processor and the at least one first executable, an order initiation offer, wherein generating the order initiation offer comprises:

generating, using the processor and based on the transaction history and the metric, a desired transaction involving a holder of the account and the business entity;

generating an incentive, using the processor, based on the AIP, the transaction history, and the metric; and transmitting, using an interface element for the at least one specially-programmed general purpose computer, the order initiation offer to the WCD.

17. The non-transitory computer-readable memory of claim 16, further comprising:

determining, using the processor, a location for the WCD.

18. The non-transitory computer-readable memory of claim 17, wherein determining that the WCD is eligible to receive an order initiation offer comprises:

determining, based on the location, that the WCD is eligible to receive the order initiation offer.

19. The non-transitory computer-readable memory of claim 17, wherein generating the at least one executable comprises:

generating, based on the location, the at least one executable.

20. The non-transitory computer-readable memory of claim 17, wherein generating the order initiation offer comprises:

generating, based on the location, the order initiation offer.

* * * * *